(12) United States Patent
Kawachi et al.

(10) Patent No.: US 7,567,327 B2
(45) Date of Patent: Jul. 28, 2009

(54) LIQUID CRYSTAL DISPLAY DEVICE

(75) Inventors: Genshiro Kawachi, Chiba (JP); Hideo Sato, Hitachi (JP); Toshio Miyazawa, Chiba (JP); Yoshiro Mikami, Hitachiota (JP); Katsumi Kondo, Mito (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/013,196

(22) Filed: Dec. 16, 2004

(65) Prior Publication Data

US 2005/0122302 A1 Jun. 9, 2005

Related U.S. Application Data

(63) Continuation of application No. 10/167,422, filed on Jun. 13, 2002, now abandoned.

(30) Foreign Application Priority Data

Jun. 28, 2001 (JP) ............................ 2001-196019

(51) Int. Cl.
*G02F 1/1343* (2006.01)
*G02F 1/1335* (2006.01)
(52) U.S. Cl. ....................... 349/141; 349/113
(58) Field of Classification Search ......... 349/113–114, 349/141
See application file for complete search history.

(56) References Cited

U.S. PATENT DOCUMENTS

| 5,165,075 | A | 11/1992 | Hiroki et al. ................... 349/43 |
| 5,383,041 | A | 1/1995 | Yamazaki et al. |
| 5,528,395 | A | 6/1996 | So |
| 5,717,473 | A | 2/1998 | Miyawaki ..................... 349/43 |
| 5,956,111 | A | 9/1999 | Ohta et al. |
| 6,175,394 | B1 | 1/2001 | Wu et al. ....................... 349/40 |
| 6,281,953 | B1 | 8/2001 | Lee et al. |
| 6,297,867 | B1 | 10/2001 | Miyahara et al. |
| 6,459,464 | B1 | 10/2002 | Nakasima et al. |
| 6,462,792 | B1 | 10/2002 | Ban et al. ..................... 349/39 |
| 6,486,930 | B1 | 11/2002 | Kwon |
| 6,512,504 | B1 | 1/2003 | Yamauchi et al. ............. 349/42 |
| 6,525,710 | B1 | 2/2003 | Kwon |
| 6,532,045 | B2 * | 3/2003 | Chung et al. ................... 349/43 |
| 6,611,310 | B2 * | 8/2003 | Kurahashi et al. ........... 349/141 |

(Continued)

FOREIGN PATENT DOCUMENTS

| JP | 6-148596 | 10/1992 |
| JP | 7-36058 | 7/1993 |
| JP | 11-271788 | 3/1998 |
| JP | 11-316383 | 11/1998 |
| KR | 1999-0045227 | 11/1998 |
| KR | 2001-0001483 | 6/1999 |
| KR | 2001-0038826 | 10/1999 |

*Primary Examiner*—Dung T. Nguyen
(74) *Attorney, Agent, or Firm*—Reed Smith LLP; Juan Carlos A. Marquez, Esq.

(57) ABSTRACT

A liquid crystal display device of low power consumption which exhibits high image quality is realized. To each liquid-crystal-side pixel region of one substrate out of respective substrates which are arranged while sandwiching liquid crystal therebetween, a first switching element and a second switching element which are operated in response to a scanning signal from a gate signal line, a pixel electrode to which a video signal is supplied from the drain signal line through the first switching element, and a counter electrode to which a reference voltage signal is supplied from a reference voltage signal line through the second switching element, and the pixel electrode and the counter electrode are respectively formed of strip-like transparent conductive layers and are substantially alternately arranged in the inside of the pixel region.

8 Claims, 32 Drawing Sheets

U.S. PATENT DOCUMENTS

| | | | |
|---|---|---|---|
| 6,630,977 B1 * | 10/2003 | Yamazaki et al. | 349/141 |
| 6,642,984 B1 | 11/2003 | Yoshida et al. | |
| 6,661,476 B1 * | 12/2003 | Abe et al. | 349/38 |
| 6,680,771 B2 * | 1/2004 | Yu et al. | 349/139 |
| 6,697,135 B1 | 2/2004 | Baek et al. | |
| 6,839,108 B1 * | 1/2005 | Hirakata et al. | 349/114 |

* cited by examiner

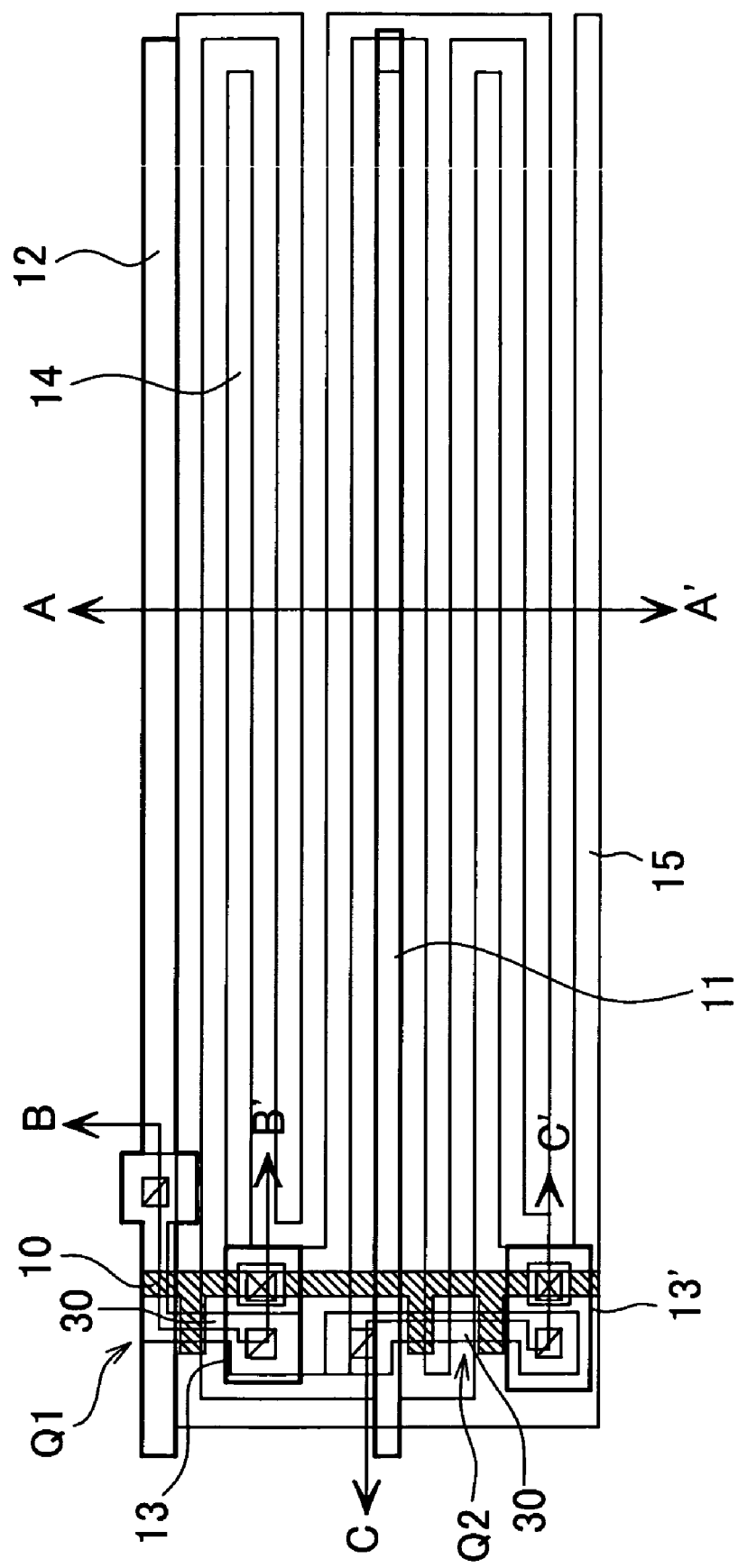

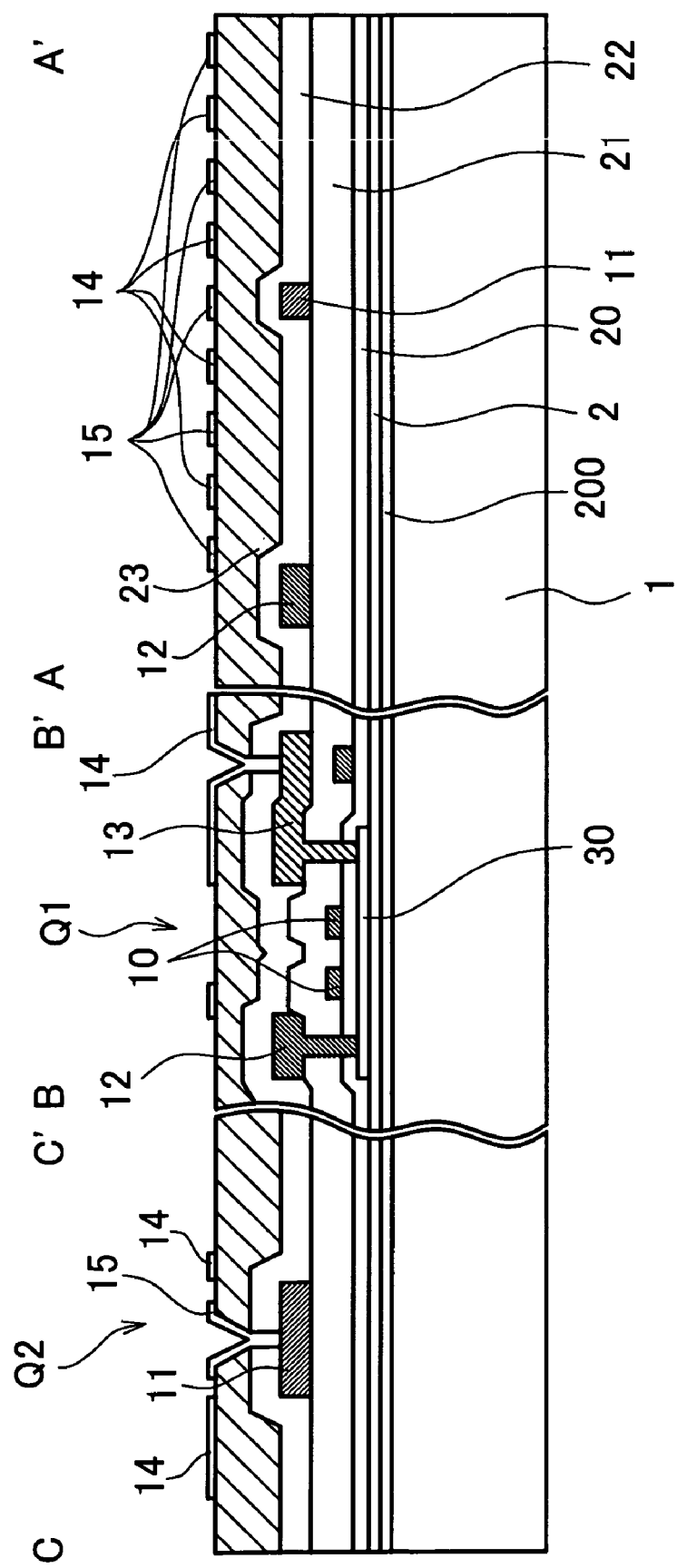

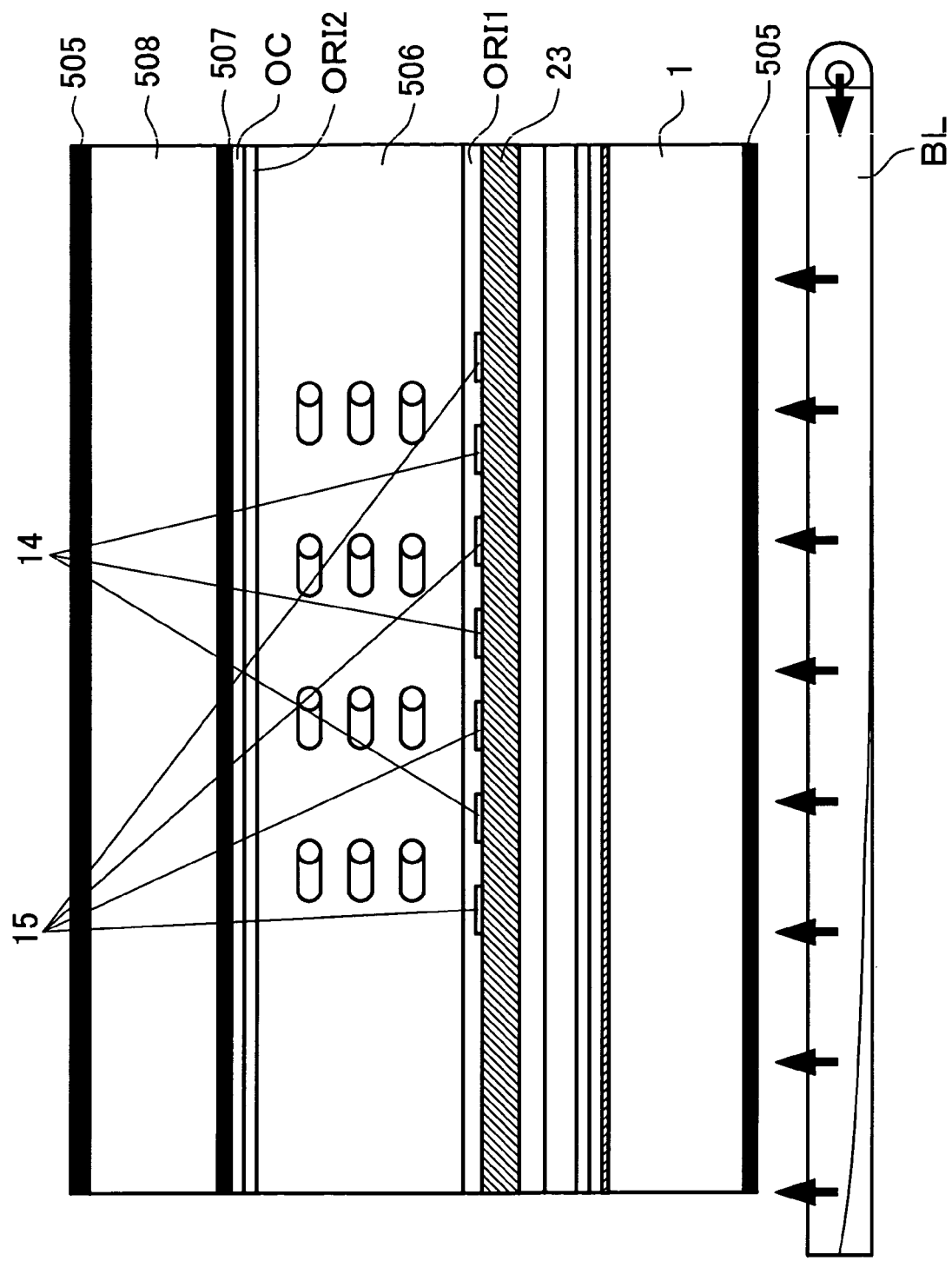

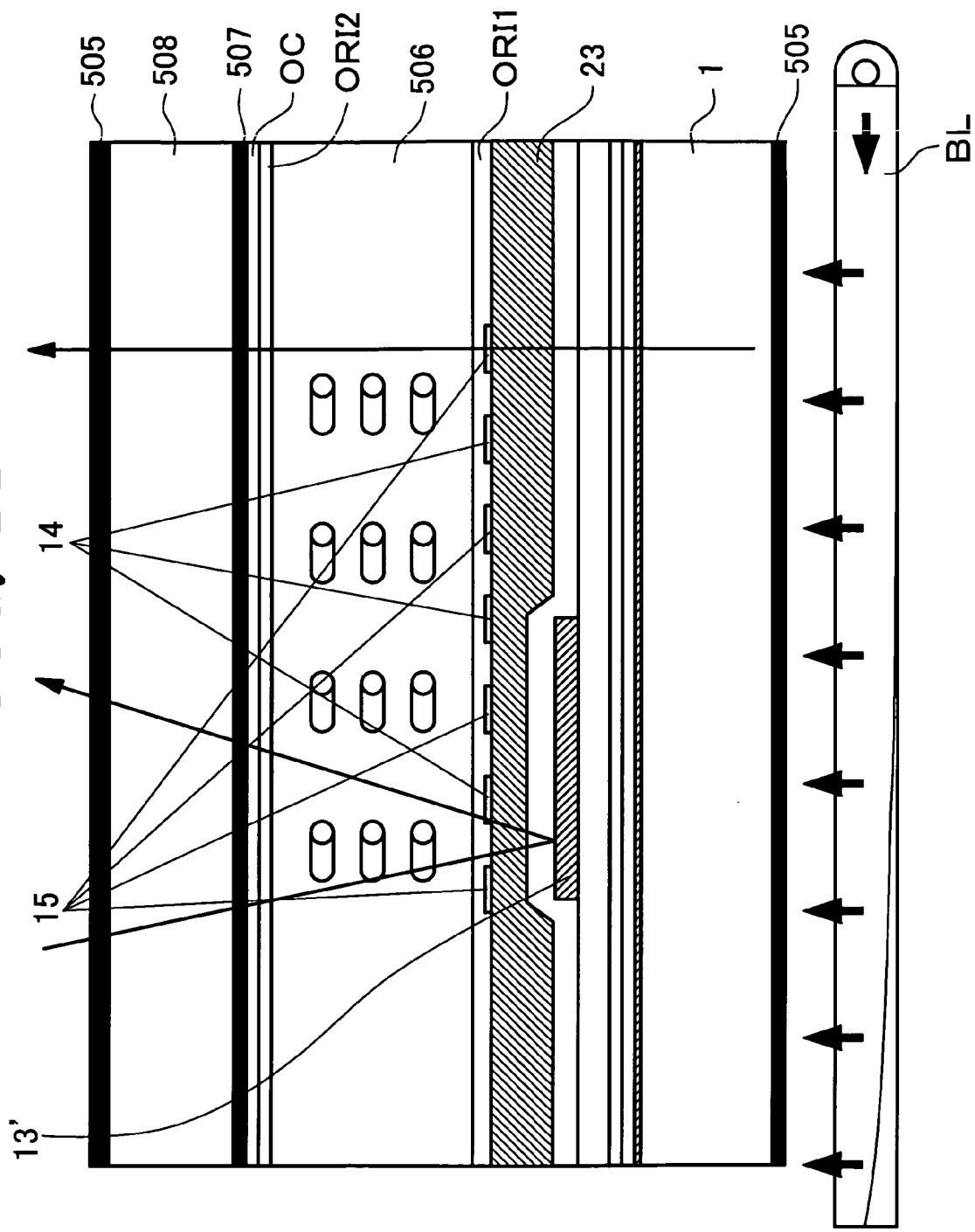

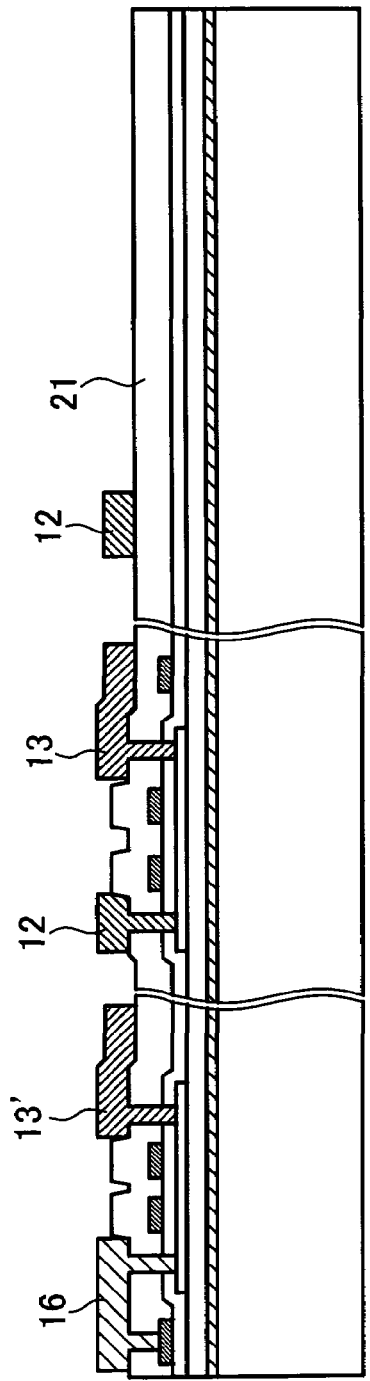
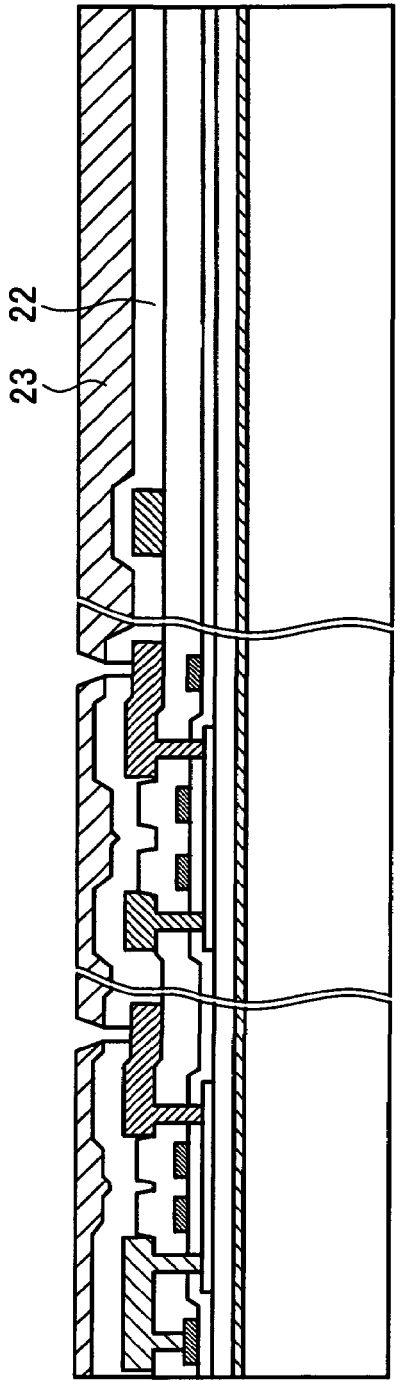

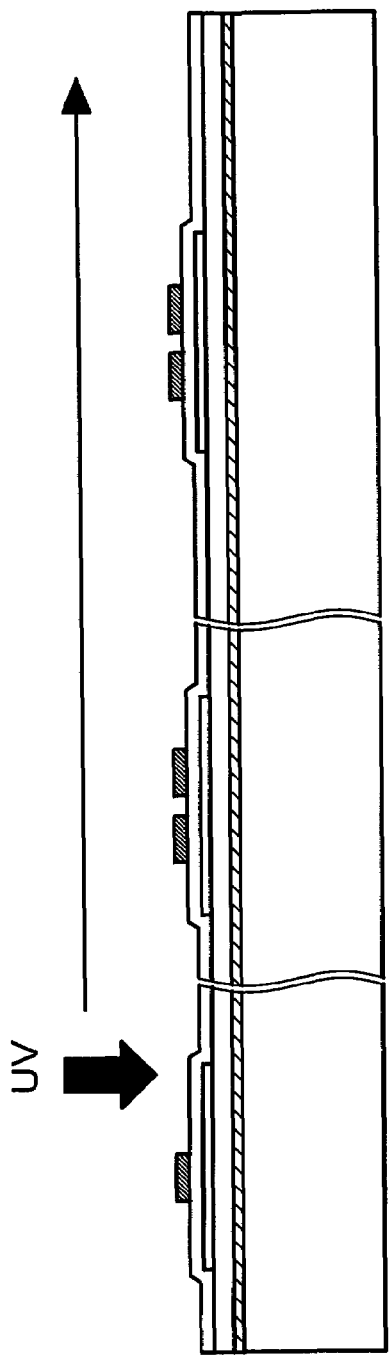
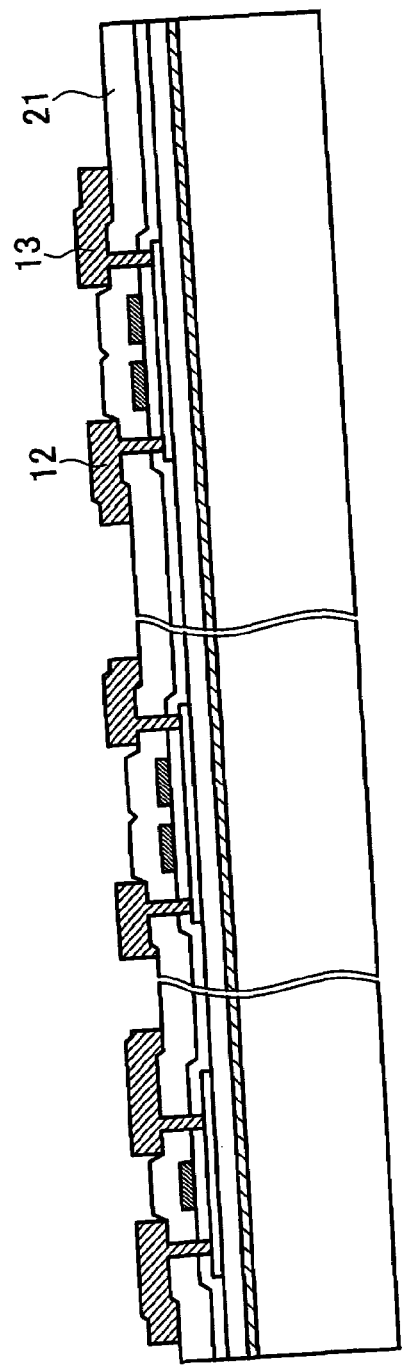

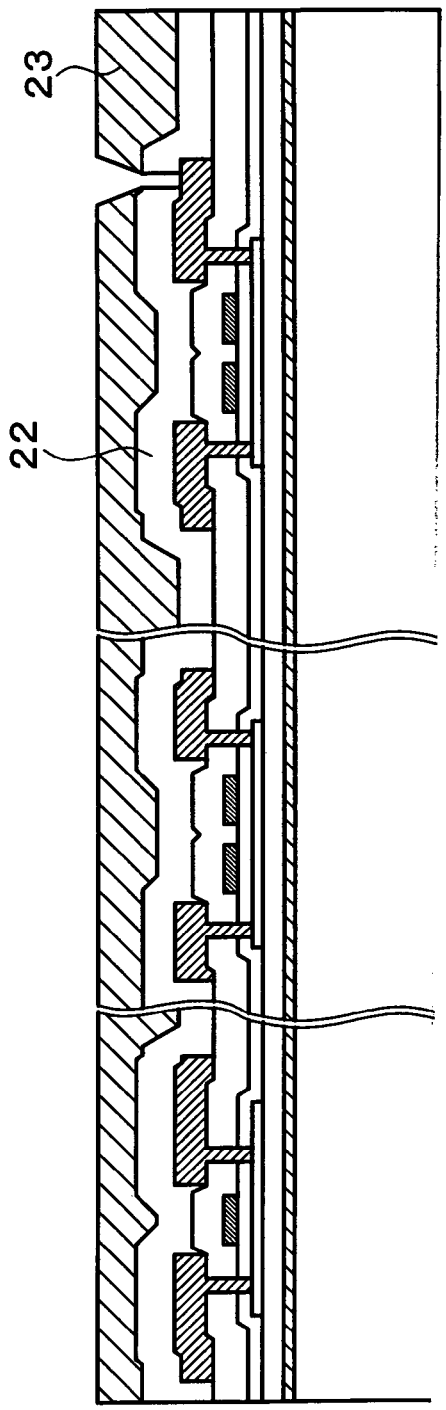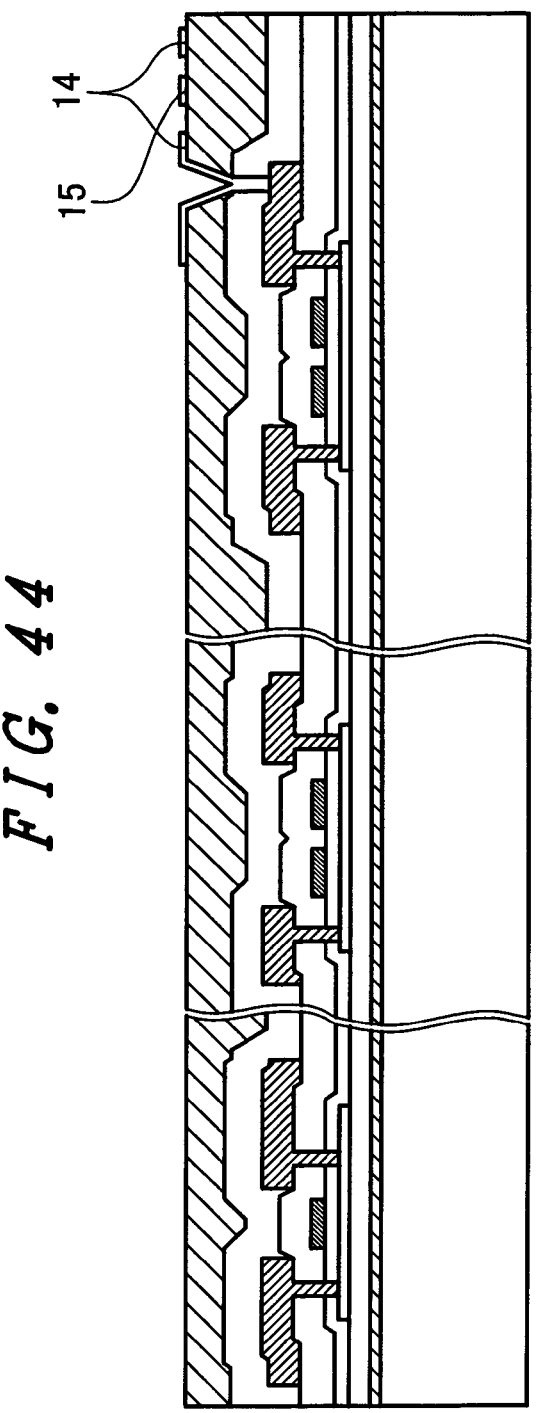

LIQUID CRYSTAL DISPLAY DEVICE

This application is a Continuation application of nonprovisional U.S. Ser. No. 10/167,422 filed on Jun. 13, 2002 now abandoned. Priority is claimed based upon U.S. application Ser. No. 10/167,422 filed on Jun. 13, 2002, which claims the priority date of Japanese Patent Application 2001-196019 filed on Jun. 28, 2001.

BACKGROUND OF THE INVENTION

The present invention relates to a liquid crystal display device, and more particularly to a so-called active matrix type liquid crystal display device.

Recently, a liquid crystal display device has been popularly used as a display equipment of image information and character information for an information equipment represented by a personal computer, a portable information terminal, a portable telephone, or a visual equipment such as digital camera or a VTR equipment with a built-in camera or the like.

Recently, along with the spreading of large capacity media brought about by the advent of DVDs and the rapid progress of large-capacity magnetic drives and the starting of BS digital broadcasting, the fusion of personal computers and video digital media has been in progress and the demand for an image display device of high image quality which can cope with these applications has been increasing.

A liquid crystal display adopting an in-plane switching (IPS) mode has been admitted as a display method which can satisfy the demand for high image quality and various improvements have been made to obtain the further enhancement of the image quality.

Here, the IPS mode liquid crystal display is a display which is constituted such that on each liquid-crystal-side pixel region of one substrate out of a pair of substrates which are arranged to face each other in an opposed manner by way of liquid crystal therebetween, a pixel electrode and a counter electrode which generates an electric field between the pixel electrode and the counter electrode are mounted, and the light transmittance of liquid crystal is controlled by a component of the electric field which is parallel to the substrates.

On the other hand, along with the spreading of portable telephones and portable information terminals, the demand for intermediate-sized or miniaturized liquid crystal display devices of extremely small power consumption has been also increasing.

With respect to the IPS mode liquid crystal display device, as disclosed in Japanese Patent Laid-Open No. 36058/1995, for example, a method which switches on or off liquid crystal based on a lateral electric field which is generated between metal electrodes constituting different layers byway of an insulation film is most popularly adopted. This structure, however, has a drawback that it is difficult to increase the pixel numerical aperture and hence, the light utilization efficiency is low compared to a usual TN-type display device.

However, to compensate for this drawback, it is necessary to increase the brightness of a backlight and hence, it is difficult for such a structure to achieve the low power consumption required by a notebook type personal computer or a portable terminal as a whole LCD module (the structure being referred to as "first conventional technique" hereinafter).

Further, although it is necessary to increase a distance between respective electrodes to increase the numerical aperture in the pixel constitution of the above-mentioned method, a driving voltage is elevated when the distance between electrodes is widened and hence, the power consumption of the driver LSI is increased. Accordingly, it has been difficult for the conventional technique to achieve the low power consumption of the IPS mode LCD.

To solve such a problem, Japanese Patent Laid-Open No. 316383/1999, for example, discloses a method in which the numerical aperture of the pixel is enhanced by driving liquid crystal based on a fringe electric field which is generated between a planar transparent electrode and a comb-like electrode made of a transparent electrode which is formed as a layer different from the former transparent electrode and above the former transparent layer (hereinafter referred to as "second conventional technique").

Further, as a method for reducing a driving voltage, Japanese Patent Laid-Open No. 148596/1994, for example, discloses a method in which the driving voltage is reduced by providing two transistors which connect liquid crystal driving electrodes to pixels and these transistors are subjected to differential driving (hereinafter referred to as "third conventional technique").

In this third conventional technique, y pieces of gate signal lines and x+1 pieces of drain signal lines are provided to the pixels arranged in a matrix array of y rows and x columns. Accordingly, the drain signal lines are commonly used by a group of pixels which belong to two neighboring columns.

First of all, the drawback of the first conventional technique lies, as mentioned previously, in that the increase of the numerical aperture is difficult because of the use of metal electrodes which form different layers by way of the insulation film as the liquid crystal driving electrodes and hence, the low power consumption cannot be achieved.

With respect to the drawback of the second conventional technique, although the second prior art can definitely enhance the numerical aperture, residual images are considerably generated compared to the conventional method and hence, it is difficult to achieve high quality images. Further, since it is necessary to form transparent electrodes which constitute respective layers during steps, the steps become complicated and hence, the reduction of cost is difficult.

With respect to the drawback of the third conventional technique, although the lowering of driving voltage can be achieved at the liquid crystal driving part, it is necessary to perform the conversion of image data in the former stage of the driver LSI such that the differential voltage is supplied between two signal lines and this makes a circuit for conversion complicated and pushes up a manufacturing cost. Further, a dynamic range of voltage in the inside of the conversion circuit is increased to the contrary compared to the usual driving and hence, the power consumption of the conversion circuit is increased whereby it is difficult to achieve the reduction of power consumption of the module as a whole.

As mentioned above, it has been difficult for the respective conventional techniques or the combination of these conventional techniques to apply the IPS mode liquid crystal to the equipment which is required to satisfy the low power consumption.

The present invention has been made to solve these drawbacks of the conventional techniques and it is an object of the present invention to provide a liquid crystal display device having a wide viewing angle which is suitably applicable to a notebook type personal computer or a portable terminal.

SUMMARY OF INVENTION

To briefly explain the summary of the typical inventions out of the inventions disclosed in the present application, they are as follows.

Means 1.
A first switching element and a second switching element which are operated in response to a scanning signal from a gate signal line, a pixel electrode to which a video signal is supplied from a drain signal line through the first switching element, and a counter electrode to which a reference voltage signal is supplied from a reference voltage signal line through the second switching element are formed on each liquid-crystal-side pixel region of one substrate out of respective substrates arranged by way of liquid crystal, and the pixel electrode and the counter electrode are respectively formed of strip-like light-transmitting conductive layers and are substantially alternately arranged in the inside of the pixel region.

Means 2.
With respect to the means 1,
the pixel electrode and the counter electrode are respectively formed as same layers on a protective film which covers the first switching element and the second switching element, and the pixel electrode and the counter electrode are respectively electrically connected with the first switching element and the second switching element via a through hole formed in the protective film.

Means 3.
With respect to the means 1,
the protective film is formed of a sequential laminated body constituted of a protective film made of inorganic material and a protective film made of organic material Means 4.
A first switching element and a second switching element which are operated in response to a scanning signal from a gate signal line, a pixel electrode to which a video signal is supplied from a drain signal line through the first switching element, and a counter electrode to which a reference voltage signal is supplied from a reference voltage signal line through the second switching element are formed on each liquid-crystal-side pixel region of one substrate out of respective substrates arranged by way of liquid crystal, the pixel electrode and the counter electrode are respectively formed of strip-like light-transmitting conductive layers which are arranged approximately parallel to the drain signal line and are substantially alternately arranged in the inside of the pixel region, and the reference voltage signal line is arranged approximately parallel to the drain signal line.

Means 5.
A first switching element and a second switching element which are operated in response to a scanning signal from a gate signal line, a pixel electrode to which a video signal is supplied from a drain signal line through the first switching element, and a counter electrode to which a reference voltage signal is supplied from a reference voltage signal line through the second switching element are formed on each liquid-crystal-side pixel region of one substrate out of respective substrates arranged by way of liquid crystal, the pixel electrode and the counter electrode are respectively formed of strip-like light-transmitting conductive layers which are arranged approximately parallel to the drain signal line and are substantially alternately arranged in the inside of the pixel region, and the reference voltage signal line is arranged approximately parallel to the drain signal line and is arranged to be superposed on one electrode out of the pixel electrode and the counter electrode.

Means 6.
A switching element which is operated in response to a scanning signal from a gate signal line, a pixel electrode to which a video signal is supplied from a drain signal line through the switching element, and a counter electrode to which a reference voltage signal is supplied from a reference voltage signal line are formed on each liquid-crystal-side pixel region of one substrate out of respective substrates arranged by way of liquid crystal, the pixel electrode and the counter electrode are respectively formed of strip-like light-transmitting conductive layers and are substantially alternately arranged in the inside of the pixel region.

Means 7.
With respect to the means 6,
the pixel electrode and the counter electrode are respectively formed as same layers on a protective film which covers the switching element, and pixel electrode and the counter electrode are respectively electrically connected with the switching element and the reference voltage signal line via a through hole formed in the protective film.

Means 8.
With respect to the means 6,
the protective film is formed of a sequential laminated body constituted of a protective film made of inorganic material and a protective film made of organic material.

Means 9.
With respect to the means 6,
the switching element is a thin film transistor having a semiconductor layer formed of polycrystalline silicon.

Means 10.
A switching element which is operated in response to a scanning signal from a gate signal line, a pixel electrode to which a video signal is supplied from a drain signal line through the switching element, and a counter electrode to which a reference voltage signal is supplied from a reference voltage signal line are formed on each liquid-crystal-side pixel region of one substrate out of respective substrates arranged by way of liquid crystal, the pixel electrode and the counter electrode are respectively formed of strip-like light-transmitting conductive layers which are arranged approximately parallel to the drain signal line and are substantially alternately arranged in the inside of the pixel region, and the reference voltage signal line is arranged approximately parallel to the drain signal line.

Means 11.
A switching element which is operated in response to a scanning signal from a gate signal line, a pixel electrode to which a video signal is supplied from a drain signal line through the switching element, and a counter electrode to which a reference voltage signal is supplied from a reference voltage signal line are formed on each liquid-crystal-side pixel region of one substrate out of respective substrates arranged by way of liquid crystal, the pixel electrode and the counter electrode are respectively formed of strip-like light-transmitting conductive layers which are arranged approximately parallel to the drain signal line and are substantially alternately arranged in the inside of the pixel region, and the reference voltage signal line is arranged approximately parallel to the drain signal line and is arranged to be superposed on one electrode out of the pixel electrode and the counter electrode.

Means 12.

A first switching element and a second switching element which are operated in response to a scanning signal from a gate signal line, a pixel electrode to which a video signal is supplied from a drain signal line through the first switching element, and a counter electrode to which a reference voltage signal is supplied from a reference voltage signal line through the second switching element are formed on each liquid-crystal-side pixel region of one substrate out of respective substrates arranged by way of liquid crystal, the pixel electrode and the counter electrode are respectively formed of strip-like light-transmitting conductive layers on an upper surface of a protective film which is formed to cover the first switching element and the second switching element and are substantially alternately arranged in the inside of the pixel region, and a reflection film which is held at a potential equal to a potential of the counter electrode is formed on a lower surface of the protective film over a whole region in the inside of the pixel region.

Means 13.

With respect to the means 12, the protective film is formed of a sequential laminated body constituted of a protective film made of inorganic material and a protective film made of organic material.

Means 14.

A first switching element and a second switching element which are operated in response to a scanning signal from a gate signal line, a pixel electrode to which a video signal is supplied from a drain signal line through the first switching element, and a counter electrode to which a reference voltage signal is supplied from a reference voltage signal line through the second switching element are formed on each liquid-crystal-side pixel region of one substrate out of respective substrates arranged by way of liquid crystal, the pixel electrode and the counter electrode are respectively formed of strip-like light-transmitting conductive layers on an upper surface of a protective film which is formed to cover the first switching element and the second switching element and are substantially alternately arranged in the inside of the pixel region, and a reflection film which is held at a potential equal to a potential of the counter electrode is formed on a lower surface of the protective film over a portion in the inside of the pixel region.

Means 15.

With respect to the means 14, the protective film is formed of a sequential laminated body constituted of a protective film made of inorganic material and a protective film made of organic material.

Means 16.

On each liquid-crystal side pixel region of one substrate out of respective substrates which are arranged to face each other in an opposed manner by way of liquid crystal, a reference voltage signal line which is arranged to divide the pixel region in halves and first and second gate signal lines which are respectively arranged at one-side pixel region and the-other-side pixel region with respect to the reference voltage signal line in parallel with the reference voltage signal line are formed, a first thin film transistor which is operated in response to a scanning signal from the first gate signal line, a first pixel electrode to which a video signal is supplied through the first thin film transistor, and a first counter electrode to which a reference voltage signal is supplied from the reference voltage signal line are provided to the one-side pixel region, a second thin film transistor which is operated in response to a scanning signal from the second gate signal line, a second pixel electrode to which a video signal is supplied through the second thin film transistor, and a second counter electrode to which a reference voltage signal is supplied from the reference voltage signal line are provided to the the-other-side pixel region, and the first and the second pixel electrodes and the first and the second counter electrodes are respectively formed of strip-like light-transmitting conductive layers on an upper surface of a protective film which is formed to cover the first and the second thin film transistors and are substantially alternately arranged in the inside of the pixel region, and a reflection film is formed on a lower surface of the protective film over either one of the one-side pixel region and the the-other-side pixel region with respect to the reference voltage signal line.

Means 17.

On each liquid-crystal-side pixel region of one substrate out of respective substrates which are arranged to face each other in an opposed manner by way of liquid crystal, a reference voltage signal line which is arranged to divide the pixel region in halves and first and second gate signal lines which are respectively arranged at one-side pixel region and the-other-side pixel region with respect to the reference voltage signal line in parallel with the reference voltage signal line are formed, a first thin film transistor and a second thin film transistor which are operated in response to a scanning signal from the first gate signal line, a first pixel electrode to which a video signal is supplied through the first thin film transistor, and a first counter electrode to which a reference voltage signal is supplied from the reference voltage signal line through the second thin film transistor are provided to the one-side pixel region, a third thin film transistor and a fourth thin film transistor which are operated in response to a scanning signal from the second gate signal line, a second pixel electrode to which a video signal is supplied through the third thin film transistor, and a second counter electrode to which a reference voltage signal is supplied from the reference voltage signal line through the fourth thin film transistor are provided to the the-other-side pixel region, and the first and the second pixel electrodes and the first and the second counter electrodes are respectively formed of strip-like light-transmitting conductive layers on an upper surface of a protective film which is formed to cover the first, the second, the third and the fourth thin film transistors and are substantially alternately arranged in the inside of the pixel region, and a reflection film is formed on a lower surface of the protective film over either one of the one-side pixel region and the the-other-side pixel region with respect to the reference voltage signal line.

Means 18.

With respect to the means 16 or 17, the protective film is formed of a sequential laminated body constituted of a protective film made of inorganic material and a protective film made of organic material.

Means 19.

With respect to the means 16 or 17
the scanning signal from the first gate signal line and the scanning signal from the second gate signal line are supplied at different timings.

Means 20.

A first switching element and a second switching element which are operated in response to a scanning signal from a gate signal line, a pixel electrode to which a video signal is supplied from a drain signal line through the first switching element, and a counter electrode to which a reference voltage signal is supplied from a reference voltage signal line through the second switching element are formed on each liquid-crystal-side pixel region of one substrate out of respective substrates arranged by way of liquid crystal, the reference voltage signal line is arranged approximately parallel to the drain signal line and is not connected with the pixel electrode of a neighboring pixel by way of the first switching element.

Means 21.

A first switching element and a second switching element which are operated in response to a scanning signal from a scanning wiring electrode, a first pixel electrode to which a voltage is supplied from a first signal wiring electrode through the first switching element, and a second pixel electrode to which a voltage is supplied from a second signal wiring electrode through the second switching element are formed on each liquid-crystal-side pixel region of one substrate out of respective substrates arranged by way of liquid crystal, the second signal wiring electrode is arranged approximately parallel to the first signal wiring electrode and is not connected with the first pixel electrode of a neighboring pixel by way of the first switching element.

Other features of the present invention will be apparent from embodiments described hereinafter.

BRIEF DESCRIPTION OF THE DRAWINGS

FIG. 4 is a plan view showing another embodiment of the unit pixel of a liquid crystal display device of the present invention.

FIG. 11 is a cross-sectional view taken along a line A-A', B-B' and C-C' of FIG. 10.

FIG. 20 is a cross-sectional view showing one embodiment of the constitution of the liquid crystal display device of the present invention including liquid crystal and a counter substrate and is also a schematic cross-sectional view of liquid crystal cells of the transmission type liquid crystal display device according to embodiments 1 to 4.

FIG. 22 is a cross-sectional view showing another embodiment of the constitution of the liquid crystal display device of the present invention including liquid crystal and a counter substrate and is also a schematic cross-sectional view of liquid crystal cells of the partial reflection/transmission type liquid crystal display device according to embodiments 6 to 7.

FIG. 33 is a cross-sectional view showing one embodiment of the manufacturing method of the liquid crystal display device according to the present invention, wherein the fifth step of the method is shown.

FIG. 34 is a cross-sectional view showing one embodiment of the manufacturing method of the liquid crystal display device according to the present invention, wherein the sixth step of the method is shown.

FIG. 41 is a cross-sectional view showing another embodiment of the manufacturing method of the liquid crystal display device according to the present invention, wherein the sixth step of the method is shown.

FIG. 42 is a cross-sectional view showing another embodiment of the manufacturing method of the liquid crystal display device according to the present invention, wherein the seventh step of the method is shown.

FIG. 43 is a cross-sectional view showing another embodiment of the manufacturing method of the liquid crystal display device according to the present invention, wherein the eighth step of the method is shown.

FIG. 44 is a cross-sectional view showing another embodiment of the manufacturing method of the liquid crystal display device according to the present invention, wherein the ninth step of the method is shown.

DESCRIPTION OF THE PREFERRED EMBODIMENTS

Preferred embodiments the liquid crystal display device according to the present invention are explained hereinafter in conjunction with attached drawings.

<Constitution of Pixel>

Embodiment 1

Figure 1:
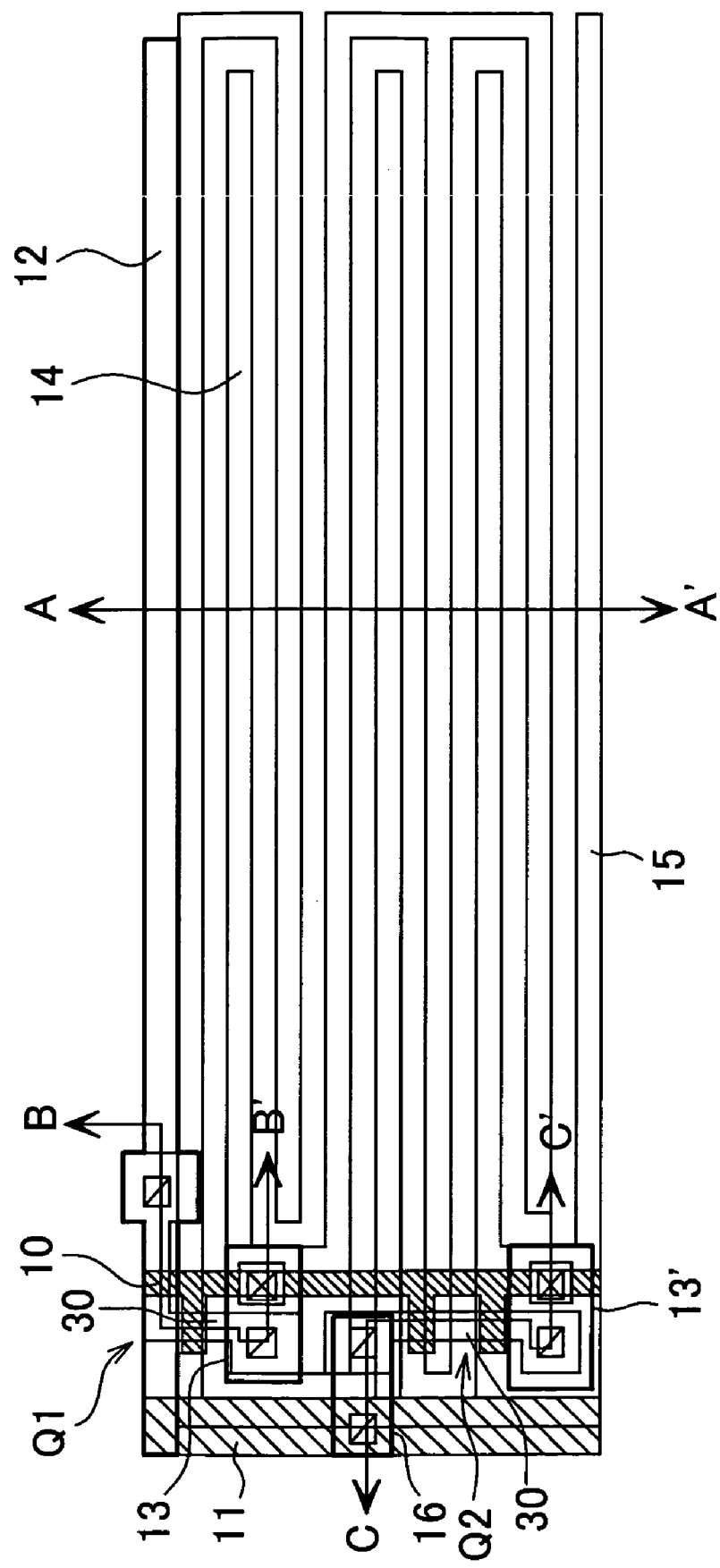
FIG. 1 is a plan view showing one embodiment of a unit pixel of a liquid crystal display device of the present invention.

FIG. 1 is a plan view showing one embodiment of a unit pixel of a liquid crystal display device according to the present invention. A liquid crystal display part of the liquid crystal display device is constituted of a large number of pixels which are arranged in a matrix array and the unit pixel constitutes one of these pixels. Accordingly, the unit pixels which are arranged above and below as well as at left and at right of the unit pixel shown in FIG. 1 also have the same constitution.

Figure 2:
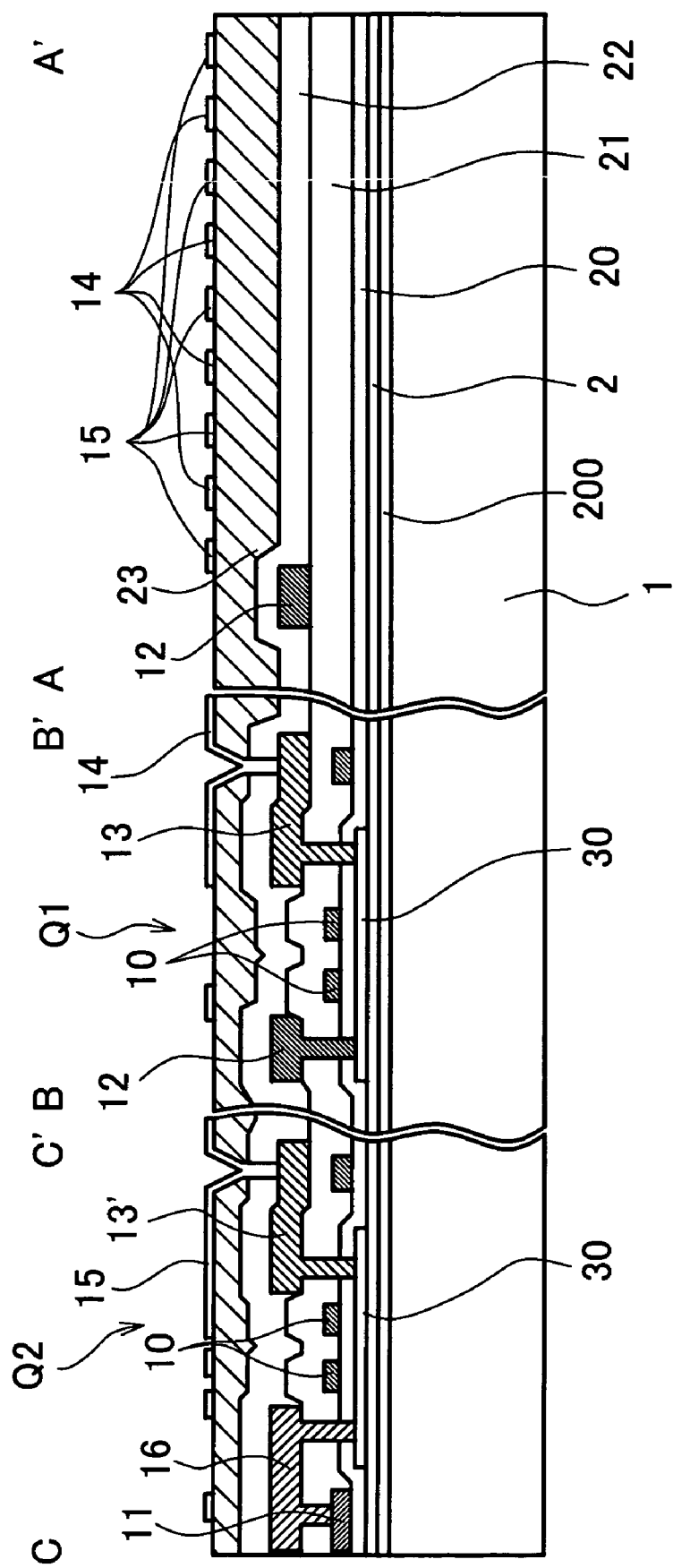
FIG. 2 is a cross-sectional view taken along a line A-A', B-B' and C-C' of FIG. 1.
Figure 3:
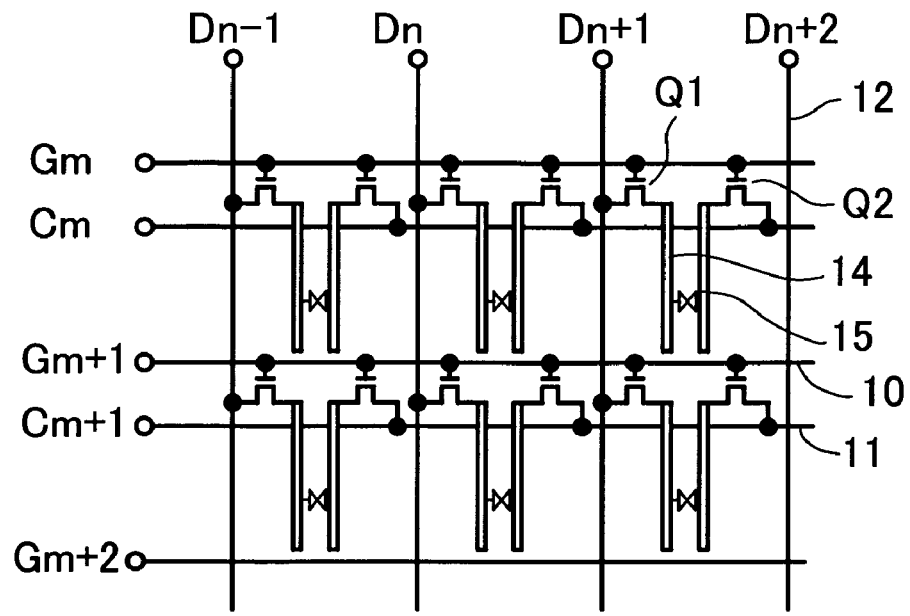
FIG. 3 is an equivalent circuit diagram of a pixel array part.

Then, respective right, middle and left views of FIG. 2 respectively show cross-sections taken along a line A-A', B-B' and C-C' in FIG. 1. Further, FIG. 3 shows an equivalent circuit of a pixel array portion.

The overall constitution of the pixel array portion is formed on a buffer insulation film consisting of a $Si_3N_4$ film 200 having a film thickness of 50 nm and a $SiO_2$ film 2 having a film thickness of 120 nm which is, in turn, formed on an alkalifree glass substrate 1 having a strain point of 670 degree centigrade. The buffer insulation film plays a role of preventing the diffusion of impurities such as Na and the like from the glass substrate 1.

On the $SiO_2$ film 2, two polycrystalline Si (hereinafter referred to as poly-Si) films 30 having a film thickness of 50 nm which correspond to two thin film transistors Q1, Q2 are formed. On respective poly-Si films 30, scanning wiring electrodes 10 made of Mo are formed by way of a gate insulation film 20 made of $SiO_2$. Further, a second signal wiring electrode (reference voltage signal line) 11 is formed using the same Mo as the scanning wiring electrodes (gate signal lines) 10.

An interlayer insulation film 21 made of $SiO_2$ is formed such that the interlayer insulation film 21 covers the above-mentioned all components. A first signal wiring electrode (drain signal line) 12 formed of a three-layered metal film made of Mo/Al/Mo and a source electrode 13 are connected to source and drain layers formed on portions of one poly-Si layer via contact through holes formed in the interlayer insulation film 21.

Further, a connection electrode 16 formed of a three-layered metal film made of Mo/Al/Mo is connected to one source and drain layers formed on portions of the other poly-Si layer and a second signal wiring electrode 11 via contact through holes formed in the interlayer insulation film 21. A second source electrode 13' formed of a three-layered metal film made of Mo/Al/Mo is connected to the other source and drain layers via contact through holes formed in the interlayer insulation film 21.

Among the three-layered metal film made of Mo/Al/Mo, the Mo film which constitutes a layer below the Al film is provided for reducing the contact resistance between the poly-Si film 30 and Al, while the Mo film which constitutes a layer above the Al film is provided for reducing the contact resistance between the source electrodes 13, 13' and the pixel electrodes 14, 15.

All of these elements are covered with a protective insulation film 22 made of $Si_3N_4$ having a film thickness of 400 nm and an organic insulation film (organic protective film) 23 containing acrylic resin as a major component and having a film thickness of 2 μm.

Further, a first pixel electrode 14 made of indium-tin-oxide (ITO) is connected to the source electrode 13 of one thin film transistor Q1 via a contact through hole formed in the protective insulation film 22 and the organic insulation film 23. A second pixel electrode (counter electrode) 15 made of ITO is connected to the second source electrode 13' of the other thin film transistor Q2 via contact through holes formed in the protective insulation film 22 and the organic insulation film 23.

As shown in FIG. 1 which is a plan view, the first pixel electrode 14 and the second pixel electrode 15 are constituted of comb-shaped electrodes which are meshed with each other. In this case, in a region which is surrounded by the scanning wiring electrodes (gate signal lines) 10 and the first signal wiring electrodes (drain signal lines) 12, a portion of the region which functions substantially as the pixel region is formed of a portion excluding a periphery of the region (corresponding to an opening portion of a black matrix formed on a liquid-crystal-side surface of the other substrate which faces one substrate in an opposed manner by way of liquid crystal). Accordingly, in the pixel region, the first pixel electrode 14 and the second pixel electrode 15 are alternately arranged in their parallel directions.

Further, as shown in FIG. 3, out of two signal wiring electrodes, the first signal wiring electrode 12 is formed such that the electrode 12 crosses the scanning wiring electrode 10, while the second signal wiring electrode 11 is arranged parallel to the scanning wiring electrode 10. A voltage supplied to the first signal wiring electrode 12 is applied to the first pixel electrode 14 through the first thin film transistor Q1 and a voltage supplied to the second signal wiring electrode 11 is applied to the second pixel electrode 15 through the second thin film transistor Q2. The liquid crystal is driven by an electric field generated between two pixel electrodes 14, 15.

In the liquid crystal display device having such a constitution, by applying the differential voltages to the first and second signal wiring electrodes 12, 11, the voltages applied to respective pixel electrodes can be reduced to one half of the voltages required in the usual case.

Further, since two pixel electrodes 14, 15 are constituted of transparent electrodes made of ITO and are formed into comb-shaped electrodes having a width of 4 µm which are meshed with each other, the driving voltage can be reduced.

Further, since the electrodes are transparent, the liquid crystal on the electrodes is driven by a fringe electric field within an area extended from an end portion of the electrode to an inner position disposed away from the end portion by 1.5 to 2 µm and hence, the liquid crystal functions in the same manner as the opening portion. Accordingly, the effective numerical aperture can be enhanced so that the light utilization efficiency is enhanced.

Due to these advantageous effects, the power consumption of the whole LCD module can be reduced.

Embodiment 2

FIG. 4 is a plan view showing another embodiment of the unit pixel of the liquid crystal display device according to the present invention and corresponds to FIG. 1. Respective right, middle and left views of FIG. 5 respectively show cross-sections taken along a line A-A', B-B' and C-C' in FIG. 4. Further, FIG. 6 is an equivalent circuit of the pixel array portion.

Various types of film materials and their laminated structures used in this embodiment are similar to those of the embodiment 1. Further, this embodiment is similar to the embodiment 1 also with respect to the constitution that the voltage supplied to the first signal wiring electrode (drain signal line) 12 is applied to the first pixel electrode 14 through the first thin film transistor Q1 and the voltage supplied to the second signal wiring electrode (reference voltage signal line) 11 is applied to the second pixel electrode 15 through the second thin film transistor Q2 and the constitution that pixel electrodes 14, 15 are constituted of transparent electrodes made of ITO and are formed into comb-shaped electrodes having a width of 4 µm which are meshed with each other.

Figure 6:
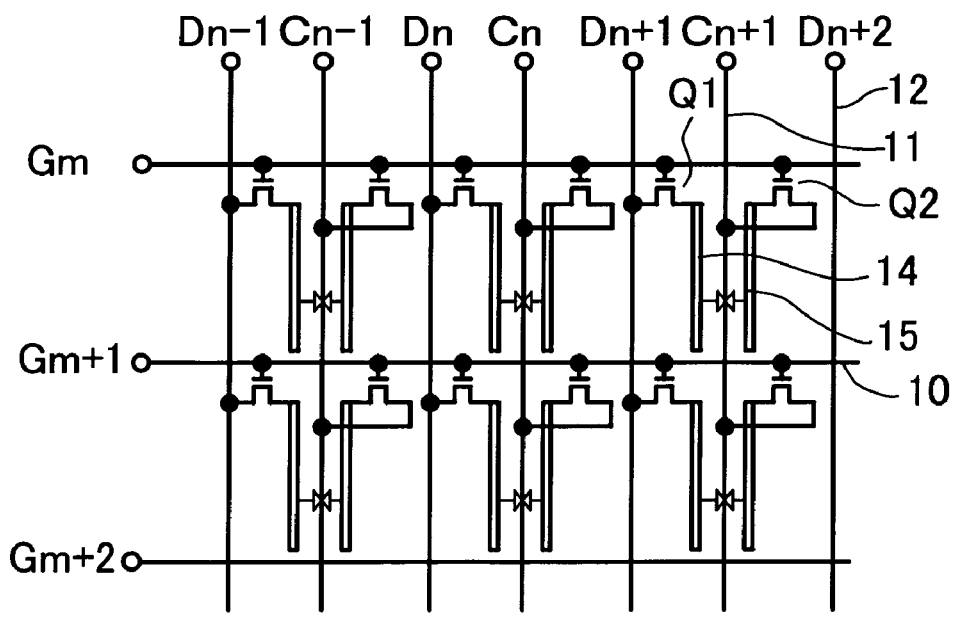
FIG. 6 is an equivalent circuit diagram of a pixel array part.

As shown in FIG. 6, this embodiment differs from the embodiment 1 in that the second signal wiring electrodes 11 are arranged approximately parallel to the first signal wiring electrodes 12.

To be more specific, a member which corresponds to the connection electrode 16 in the embodiment 1 is used as the second signal wiring electrode 11 and is extended in the direction parallel to the first signal wiring electrode 12. Here, the second signal wiring electrode 11 is arranged as a layer below one electrode out of the comb-shaped second pixel electrodes 15.

Due to such an arrangement, out of the through holes for connecting the second signal wiring electrode 11 and the connection electrode 16 which are necessary in the embodiment 1, one through hole can be eliminated so that the numerical aperture can be enhanced. Further, by arranging the second signal wiring electrode 11 as the layer below one electrode out of the comb-shaped second pixel electrodes 15, the lowering of the numerical aperture due to the presence of the opaque second signals wiring electrode 11 can be minimized.

When the second signal wiring electrode 11 is extended parallel to the scanning wiring electrode 10, the capacitance of the second signal wiring electrode 11 becomes a sum of charge holding capacitance of all pixels connected to the second signal wiring electrode 11 and the capacitance of the liquid crystal layer and hence, the capacitance of the second signal wiring electrode 11 becomes an extremely large value. When the resistance value of the second signal wiring electrode 11 is not sufficiently small, there arises a possibility that shadow wing in the lateral direction is generated due to the delay of signal thus giving rise to poor image quality.

In view of the above, in the second embodiment, the second signal wiring electrode 11 is arranged such that the second signal wiring electrode 11 is extended in the direction parallel to the first signal wiring electrode 12. In this case, the capacitance per a single piece of second signal wiring electrode 11 becomes a sum of a crossing capacitance between a common electrode (second signal wiring electrode 11) and a scanning electrode (scanning wiring electrode 10), a charge holding capacitance for selected one pixel and a capacitance of the liquid crystal layer and hence, the capacitance per a single piece of second signal wiring electrode 11 becomes a small value compared to the former value. Accordingly, the above-mentioned drawback on the image quality derived from the delay of signals is not generated.

Embodiment 3

Figure 7:
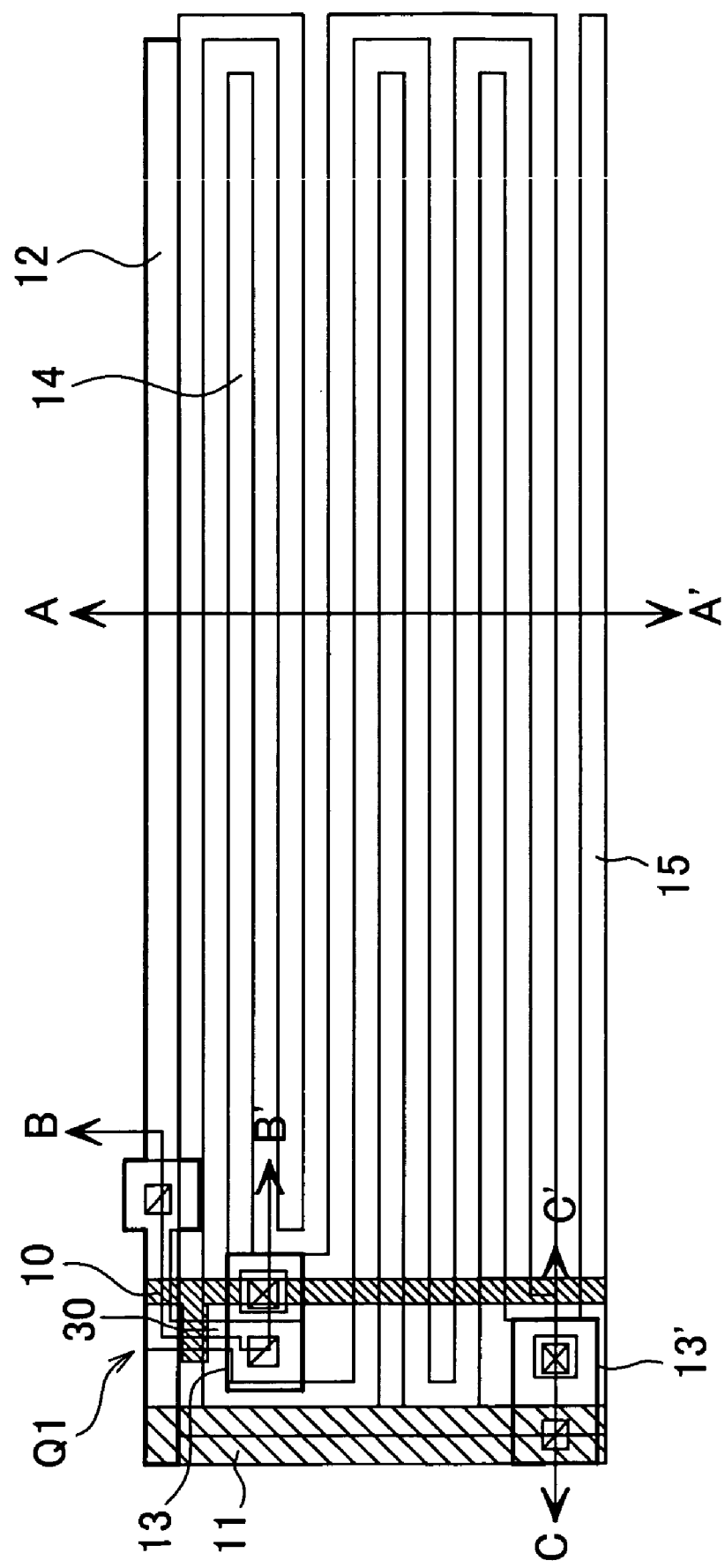
FIG. 7 is a plan view showing another embodiment of the unit pixel of a liquid crystal display device of the present invention.

FIG. 7 is a plan view showing another embodiment of the unit pixel of the liquid crystal display device according to the present invention and corresponds to FIG. 1.

Figure 8:
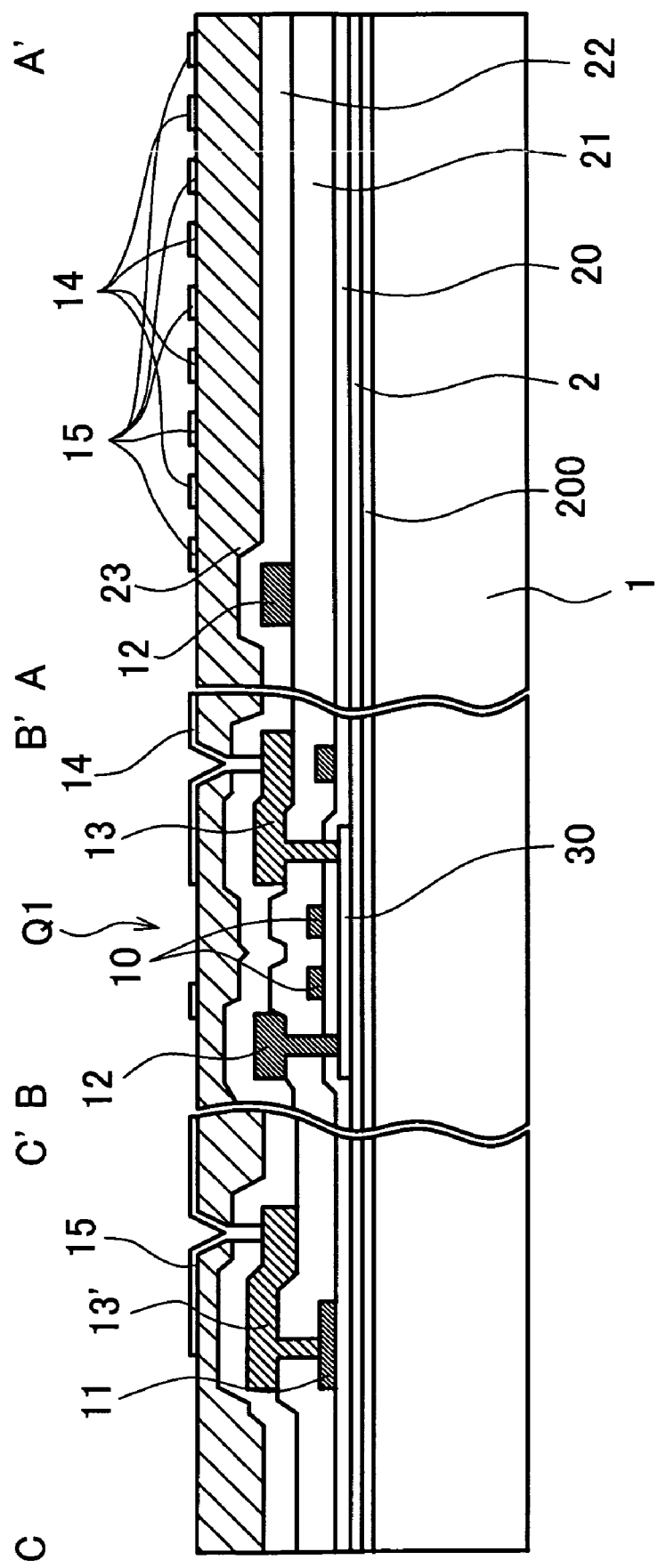
FIG. 8 is a cross-sectional view taken along a line A-A', B-B' and C-C' of FIG. 7.
Figure 9:
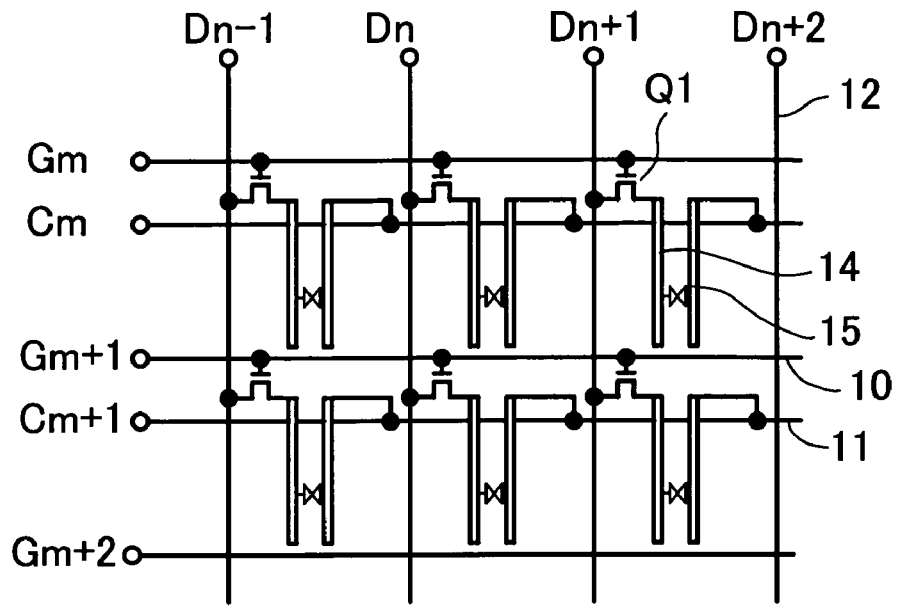
FIG. 9 is an equivalent circuit diagram of a pixel array part.

Respective right, middle and left views of FIG. 8 respectively show cross-sections taken along a line A-A', B-B' and C-C' in FIG. 7. Further, FIG. 9 shows an equivalent circuit of a pixel array portion.

Various types of film materials and their laminated structures used in this embodiment are substantially similar to those of the embodiment 1.

In this embodiment, the second signal wiring electrode 11 and the second pixel electrode 15 are directly connected to each other and a thin film transistor Q2 is not inserted between them. By using only one piece of thin film transistor which is formed in the pixel, an area occupied by the thin film transistor can be reduced so that the numerical aperture of pixels can be increased. Further, even when such a constitution is adopted, by applying a differential voltage between the second signal wiring electrode 11 and the first signal wiring electrode 12, it is possible to obtain the driving voltage reduction effect in the same manner as the embodiments 1 and 2.

As a driving method, it is possible to use either one of a frame inversion driving which inverts the polarity of voltage every 1 frame period and a line inversion driving which inverts the polarity of voltage every 1 scanning period.

Further, this embodiment is similar to the embodiment 1 with respect to the constitution that two pixel electrodes 14, 15 are constituted of transparent electrodes made of ITO and are formed into comb-shaped electrodes having a width of 4 μm which are meshed with each other. Accordingly, this embodiment can realize the enhancement of numerical aperture and the reduction of driving voltage power source in the same manner as the embodiment 1.

By using the poly-Si thin film transistor having the large driving ability as the thin film transistor for driving pixel as in the case of this embodiment, the thin film transistor can be miniaturized and hence, the numerical aperture of the pixel can be enhanced.

Embodiment 4

Figure 12:
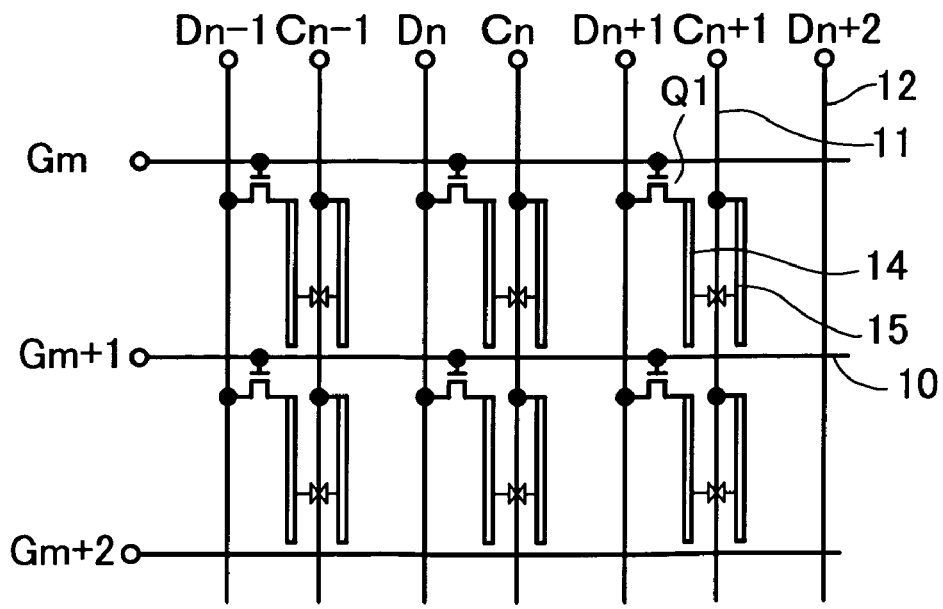
FIG. 12 is an equivalent circuit diagram of a pixel array part.
Figure 10:
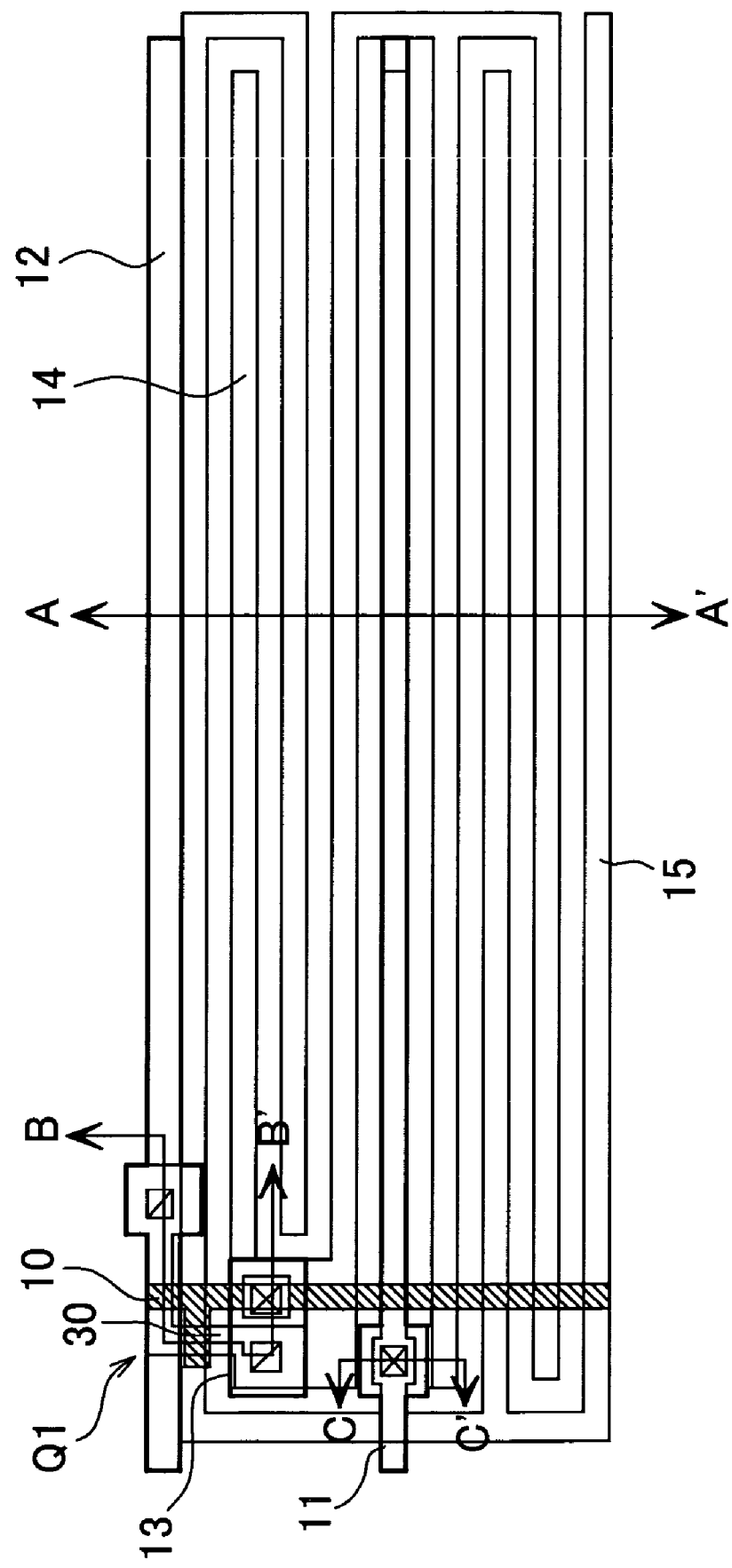
FIG. 10 is a plan view showing another embodiment of the unit pixel of a liquid crystal display device of the present invention.

FIG. 10 is a plan view showing another embodiment of the unit pixel of the liquid crystal display device according to the present invention and corresponds to FIG. 1. Respective right, middle and left views of FIG. 11 respectively show cross-sections taken along a line A-A', B-B' and C-C' in FIG. 10. Further, FIG. 12 shows an equivalent circuit of a pixel array portion.

Various types of film materials and their laminated structures used in this embodiment are substantially similar to those of the embodiment 1.

In this embodiment, in the same manner as the embodiment 3, the second signal wiring electrode (reference voltage signal line) 11 and the second pixel electrode (counter electrode) 15 are directly connected to each other and a thin film transistor Q2 is not inserted between them.

However, here, the second signal wiring electrode 11 is arranged approximately parallel to the first signal wiring electrode 12. Due to such an arrangement, out of through holes which connect the second signal wiring electrode 11 and the connection electrode 16, one through hole can be eliminated and hence, the numerical aperture can be enhanced.

Further, by arranging the second signal wiring electrode 11 as the layer below one electrode out of the comb-shaped second pixel electrodes 15, the lowering of the numerical aperture due to the presence of the opaque second signal wiring electrode 11 can be minimized. Still further, since the thin film transistor Q2 is not present between the second signal wiring electrode 11 and the second pixel electrode 15, the numerical aperture can be further enhanced.

This embodiment can obtain the largest numerical aperture among all of the embodiments described heretofore.

Further, this embodiment can obtain the driving voltage reduction effect as that of the embodiment 3.

As a driving method, it is possible to use either one of a frame inversion driving which inverts the polarity of voltage every 1 frame period and a column inversion driving which inverts the polarity of voltage every 1 frame period but applies a voltage of an inverse polarity to the neighboring first signal wiring electrode 12.

Embodiment 5

Figure 13:
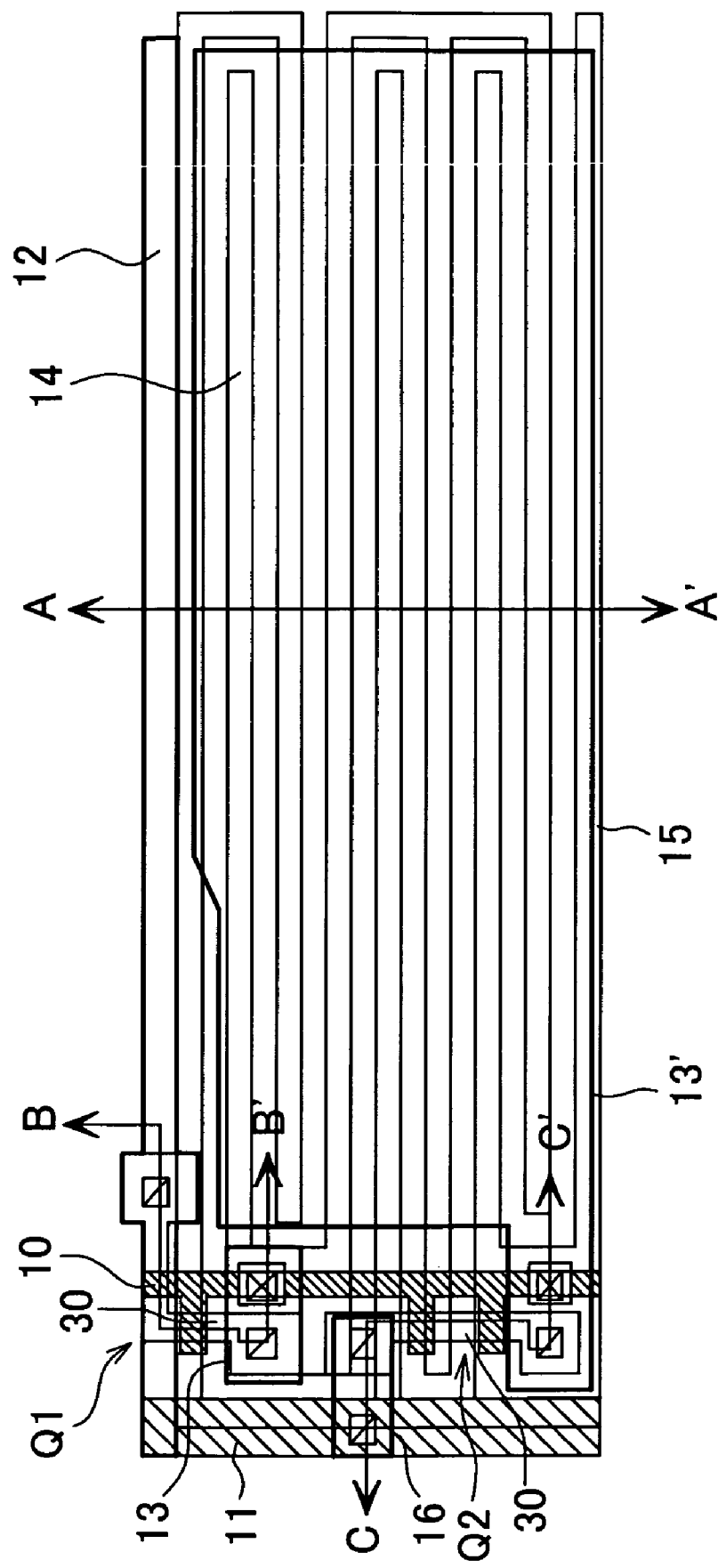
FIG. 13 is a plan view showing another embodiment of the unit pixel of a liquid crystal display device of the present invention.
Figure 14:
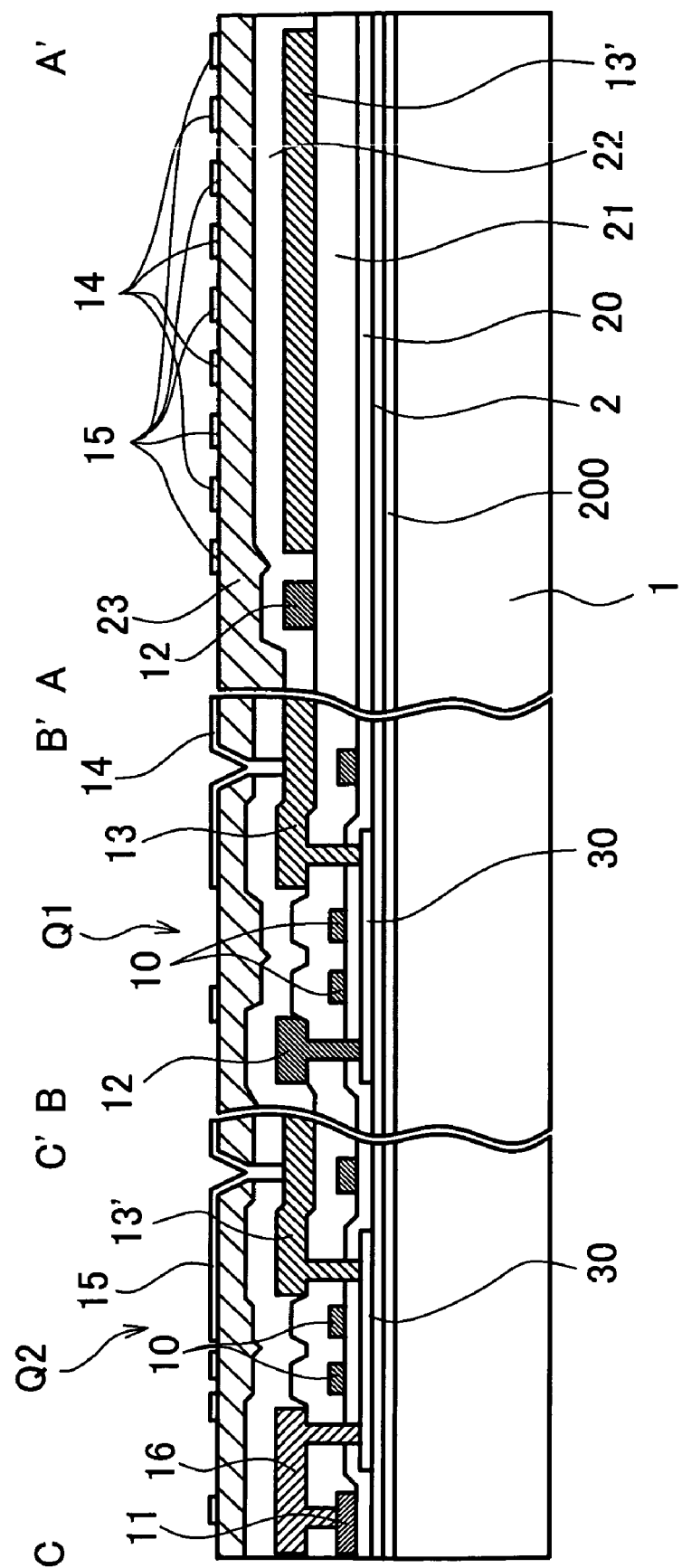
FIG. 14 is a cross-sectional view taken along a line A-A', B-B' and C-C' of FIG. 13.

FIG. 13 is a plan view showing another embodiment of the unit pixel of the liquid crystal display device according to the present invention and corresponds to FIG. 1. Respective right, middle and left views of FIG. 14 respectively show cross-sections taken along a line A-A', B-B' and C-C' in FIG. 13.

Various types of film materials and their laminated structures used in this embodiment are similar to those of the embodiment 1. Further, this embodiment is similar to the embodiment 1 also with respect to the constitution that the voltage supplied to the first signal wiring electrode (drain signal line) 12 is applied to the first pixel electrode 14 through the first thin film transistor Q1 and a voltage supplied to the second signal wiring electrode (reference voltage signal line) 11 is applied to the second pixel electrode (counter electrode) 15 through the second thin film transistor Q2 and the constitution that pixel electrodes 14, 15 are constituted of transparent electrodes made of ITO and are formed into comb-shaped electrodes having a width of 4 μm which are meshed with each other.

This embodiment is characterized in that the reflection electrode 13' which reflects light is arranged as a layer below the comb-shaped electrodes 14, 15 constituting the display region which are meshed with each other.

The reflection electrode 13' is formed by extending the second source electrode 13' in the embodiment 1 over the whole area of the pixel region. Accordingly, the reflection electrode 13' can have a potential equal to that of the second pixel electrode 15. Further, with respect to the constitution on the surface of the reflection portion, only the upper layer made of Mo is eliminated from the second source electrode 13' constituted of a three-layered film made of Mo/Al/Mo. Due to such a constitution, the light reflectance on the surface of the reflection electrode 13' can be largely increased from 40% to 90%.

In this embodiment, the image display is obtained by reflecting the external light on the reflection electrode 13'.

Further, the liquid crystal is driven by the lateral electric field formed between two pixel electrodes 14, 15 and the fringe electric field formed between the first pixel electrode 14 and the reflection electrode 13'.

Also in the previously-mentioned second conventional technique (Japanese Patent Laid-Open No. 316383/1999), there is disclosed the lateral-electric-field type liquid crystal display device which uses the planar transparent electrodes and the comb-shaped electrodes made of transparent electrodes which are formed as a layer different from and above the planar transparent electrodes. However, in the conventional technique, an equal potential is applied to all comb-shaped electrodes and only the electric field which is generated between the planar electrodes and the comb-shaped electrodes is utilized. This embodiment differs from such conventional technique in that two comb-shaped electrodes which are meshed with each other are used and the liquid crystal is driven by both of the electric field generated between two opposing comb-shaped electrodes and the fringe electric field generated between one of the comb-shaped electrodes and the reflection electrode.

Due to such a constitution, the more uniform electric field can be applied between two comb-shaped electrodes and hence, it is possible to obtain favorable display images.

Embodiment 6

Figure 15:
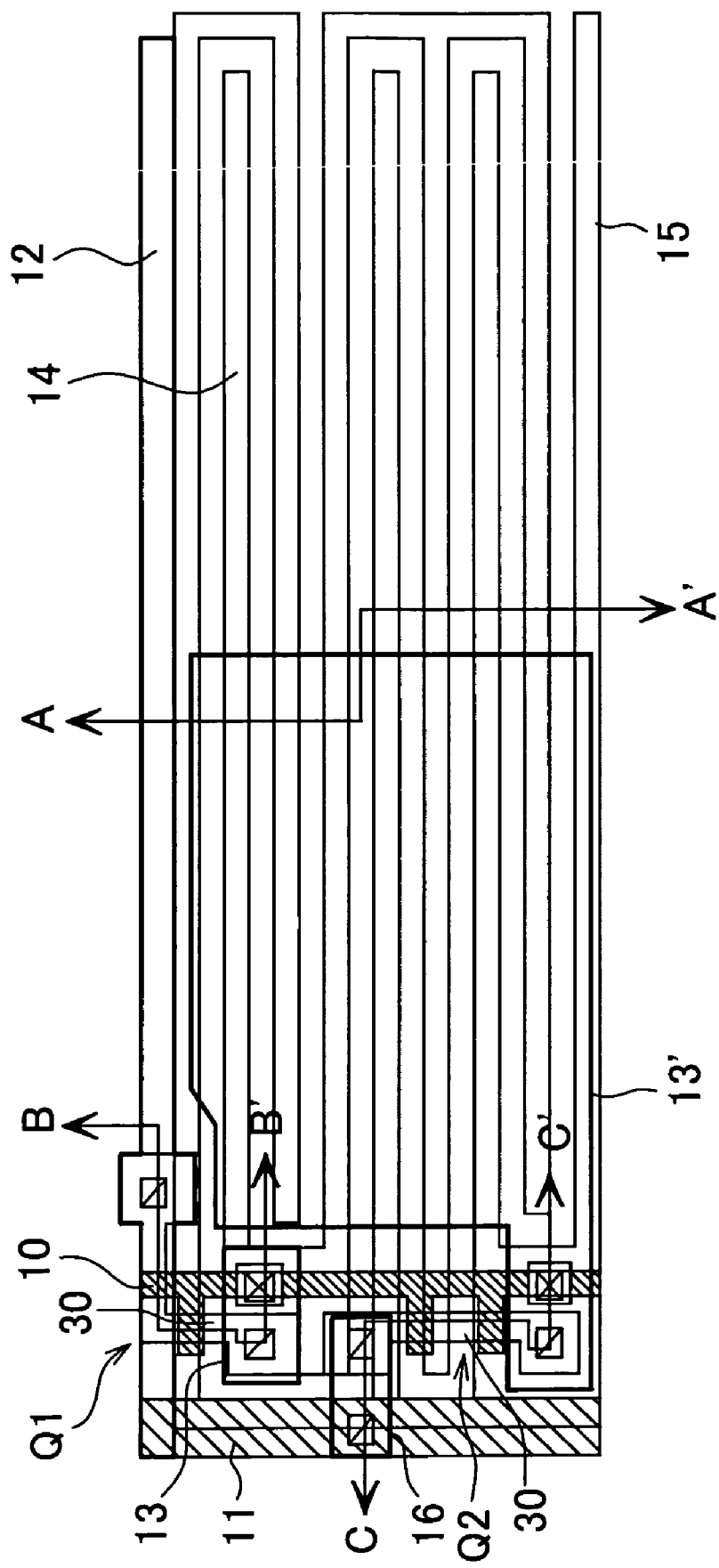
FIG. 15 is a plan view showing another embodiment of the unit pixel of a liquid crystal display device of the present invention.

FIG. 15 is a plan view showing another embodiment of the unit pixel of the liquid crystal display device according to the present invention and corresponds to FIG. 1.

Figure 16:
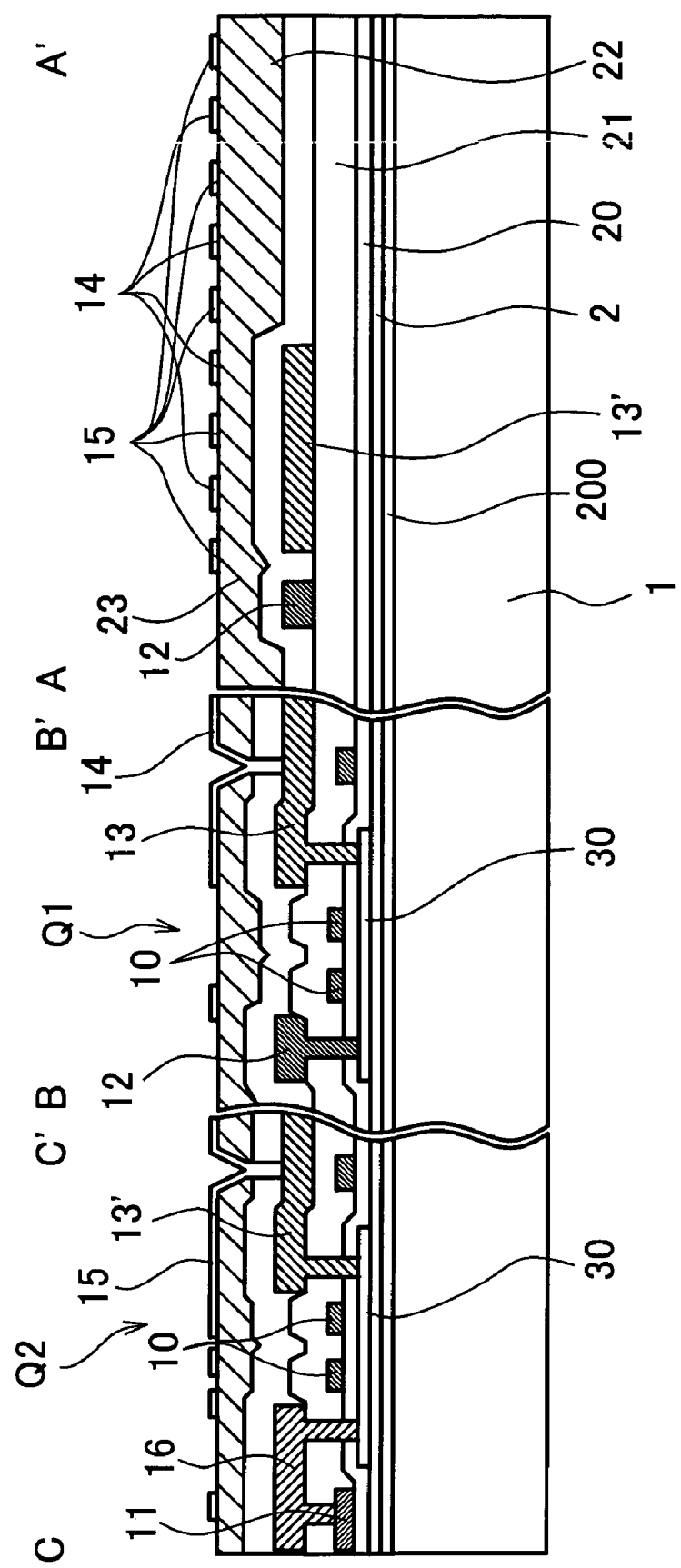
FIG. 16 is a cross-sectional view taken along a line A-A', B-B' and C-C' of FIG. 15.

Respective right, middle and left views of FIG. 16 respectively show cross-sections taken along a line A-A', B-B' and C-C' in FIG. 15.

In this embodiment, various types of film materials and their laminated structures used in this embodiment are similar to those of the embodiment 1. Further, this embodiment is similar to the embodiment 1 also with respect to the constitution that the voltage supplied to the first signal wiring electrode (drain signal line) 12 is applied to the first pixel electrode 14 through the first thin film transistor Q1 and a voltage supplied to the second signal wiring electrode (reference voltage signal line) 11 is applied to a second pixel electrode (counter electrode) 15 through the second thin film transistor Q2 and the constitution that two pixel electrodes 14, 15 are constituted of transparent electrodes made of ITO and are formed into comb-shaped electrodes having a width of 4 μm which are meshed with each other.

In this embodiment, the reflection electrode 13' which partially reflects light is arranged as a layer below the comb-shaped electrodes 14, 15 which constitute the display region and are meshed with each other thus constituting the partial reflection/transmission type display device. The reflection electrode 13' has the same layer structure as that of the embodiment 5 and only differs from the embodiment with respect to the constitution that the reflection electrode 13' is formed extending over approximately half of the pixel region. That is, the reflection display region and the transmission display region are constituted by the region where the reflection electrode 13' is formed and the other remaining region.

The image display is performed by reflecting the external light by the reflection electrode 13' in the reflection display mode and by utilizing light from the backlight in the transmission display mode. The transmission and reflection display principles are those which have been described heretofore.

The partial reflection/transmission type display device is suitable for a miniaturized equipment such as a portable telephone, a portable terminal or the like which is popularly used outdoors. With the use of the pixel structure of the present invention, the driving voltage can be reduced so that the equipment of low power consumption can be realized. Further, since the equipment can obtain the wide viewing angle which is the feature of the lateral electric field driving method, it is possible to obtain the favorable image display.

Embodiment 7

Figure 17:
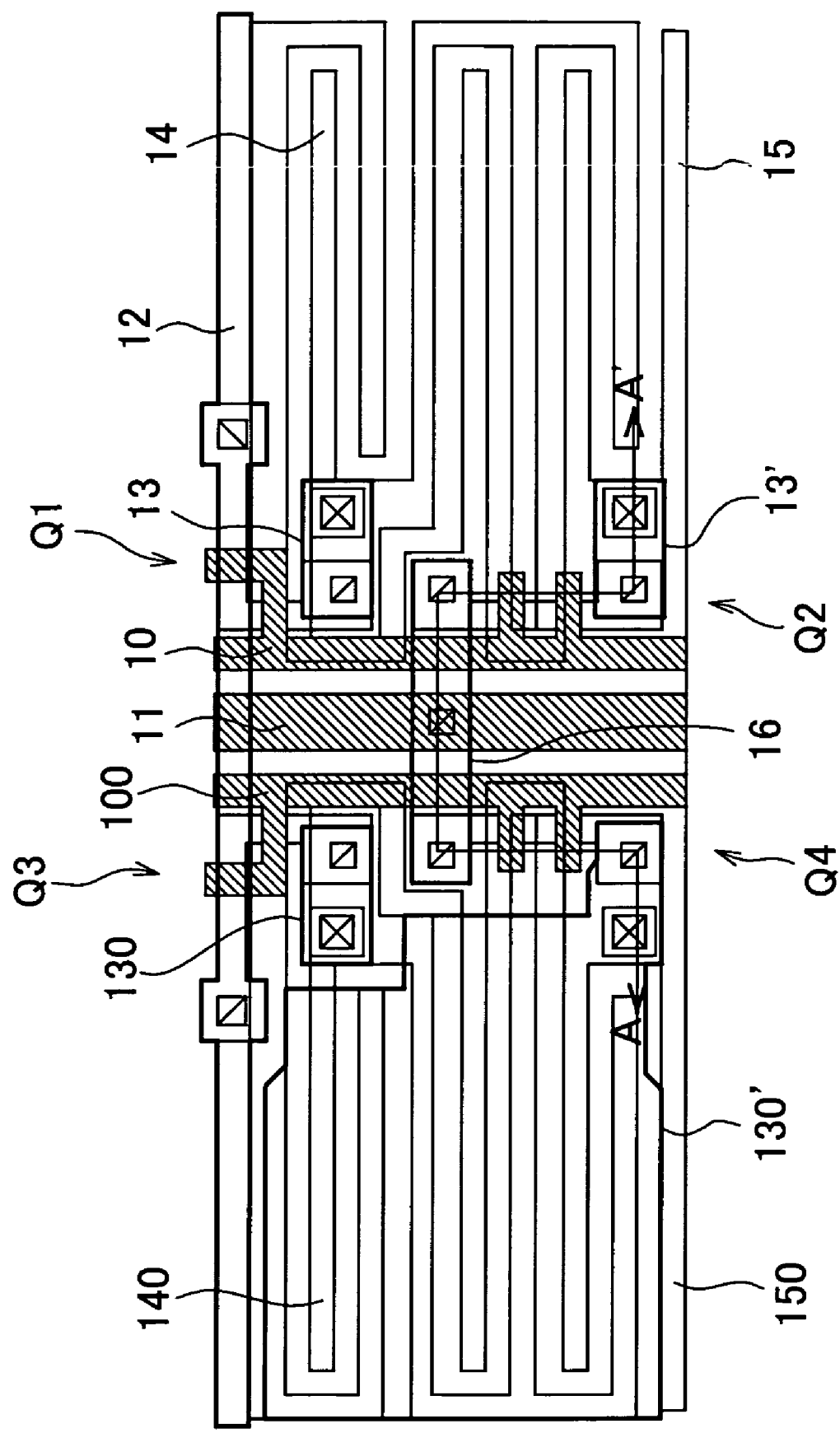
FIG. 17 is a plan view showing another embodiment of the unit pixel of a liquid crystal display device of the present invention.
Figure 18:
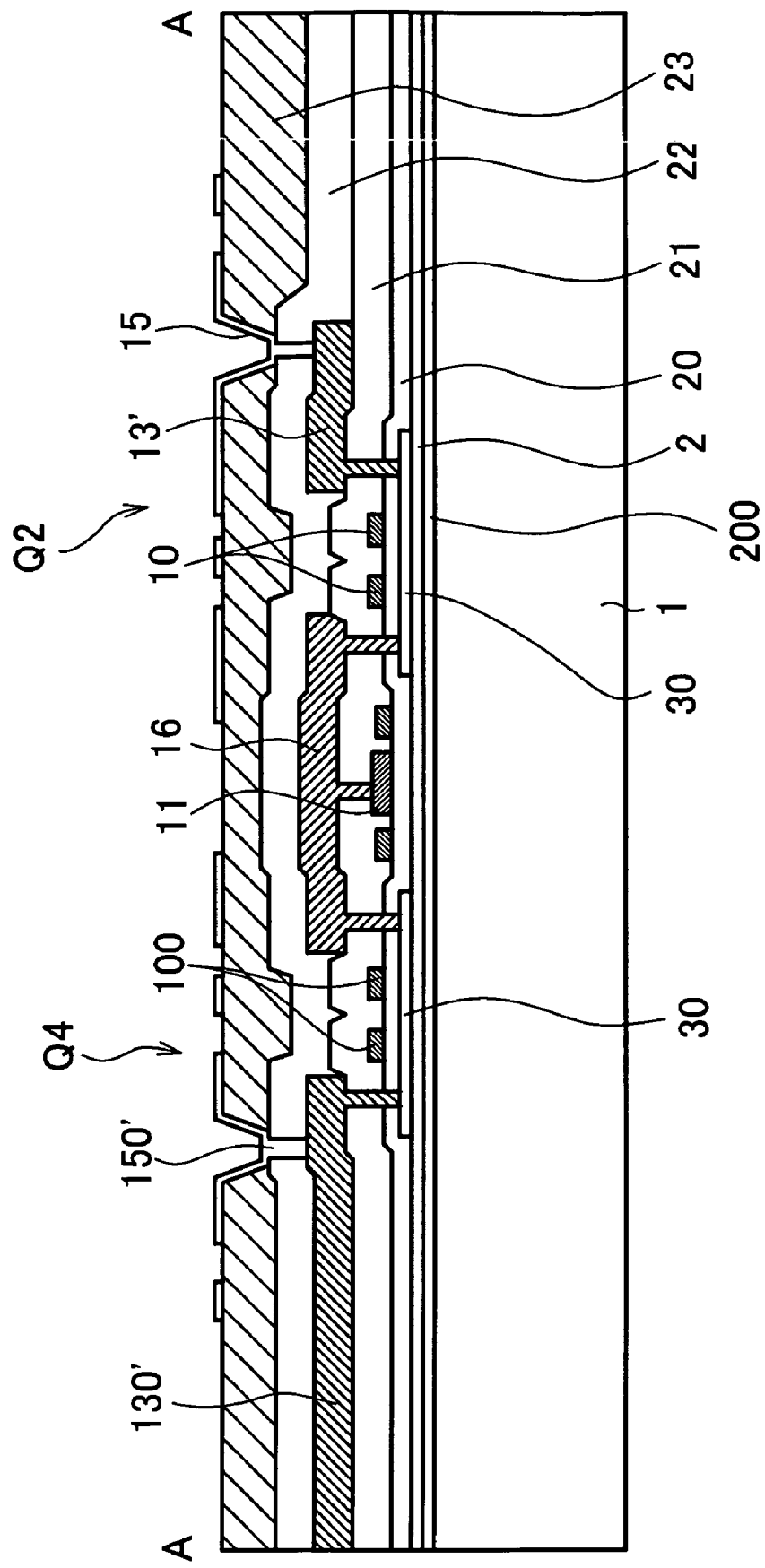
FIG. 18 is a cross-sectional view taken along a line A-A' of FIG. 17.
Figure 19:
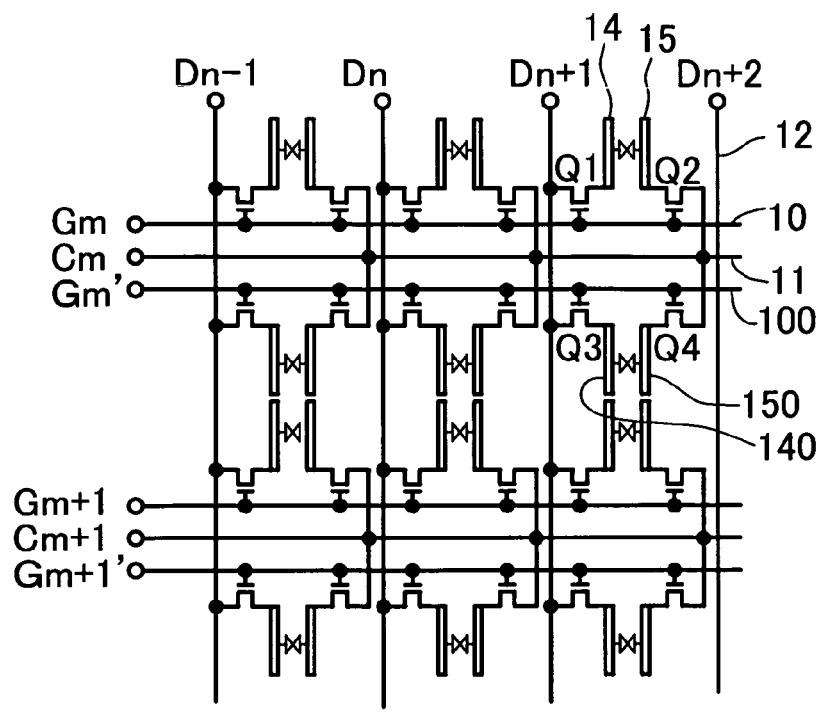
FIG. 19 is an equivalent circuit diagram of a pixel array part.

FIG. 17 is a plan view showing another embodiment of the unit pixel of the liquid crystal display device-according to the present invention and corresponds to FIG. 1. FIG. 18 shows a cross section of a part taken along a line A-A' of FIG. 17. FIG. 19 shows an equivalent circuit of a pixel array portion.

In this embodiment, various types of film materials and their laminated structures used in this embodiment are similar to those of the embodiment 1.

In this embodiment, first of all, the first voltage supplied to the first signal wiring electrode (drain signal line) 12 is applied to the first pixel electrode 14 through the first thin film transistor Q1 and the second voltage supplied to the second signal wiring electrode (reference voltage signal line) 11 is applied to the second pixel electrode (counter voltage) 15 through the second thin film transistor Q2.

Further, a third voltage supplied to the first signal wiring electrode 12 is applied to a third pixel electrode 140 through a third thin film transistor Q3 and a fourth voltage supplied to the second signal wiring electrode 11 is applied to a fourth pixel electrode 150 through a fourth thin film transistor Q4. All of the first to the fourth pixel electrodes 14, 15, 140, 150 are constituted as comb-shaped electrodes which have a width of 4 μm and are meshed with each other.

Then, the reflection electrodes 130' are formed as layers below the third and the fourth pixel electrodes 140, 150 and are operated in the reflection display mode. On the other hand, the display region constituted of the first and the second pixel electrodes 14, 15 is operated in the transmission display mode and is operated as a partial reflection/transmission display device as a whole.

This embodiment is characterized in that a pair of thin film transistors Q1 to Q4 are formed on each one of the reflection display region and the transmission display region and these thin film transistors Q1 to Q4 are driven with the voltages which are different from each other.

The gate electrodes of the first and the second thin film transistors Q1, Q2 are connected to the first scanning wiring electrode 10, and the gate electrodes of the third and the fourth thin film transistors Q3, Q4 are connected to the second scanning wiring electrode 100. The selection gate pulse voltages are applied at respectively different timing and the image signals are applied to the first signal wiring electrode 12 and the second signal wiring electrode 11 in synchronism with such an operation whereby it is possible to apply different voltages to respective reflection and transmission pixel electrodes.

Although such a constitution is disadvantageous in view of the numerical aperture since the number of thin film transistors Q1 to Q4 in the inside of the pixel becomes four, when the voltage value which generates the peak brightness differs between the reflection mode and the transmission mode, the constitution is advantageous to obtain the favorable images.

Although this embodiment is constituted such that the thin film transistors Q2, Q4 are interposed between the second signal wiring electrode (reference voltage signal line) 11 and the second or the fourth pixel electrode (counter voltage) 15, 150, it is needless to say that these thin film transistors Q2, Q4 are eliminated.

<<One Embodiment of Constitution Including Liquid Crystal and Counter Substrate>>

FIG. 20 is a schematic cross-sectional view of liquid crystal cells of the transmission type liquid crystal display device according to the embodiments 1 to 4 of the present invention.

As mentioned previously, with respect to a liquid crystal layer 506, on a glass substrate 1 which is disposed below the liquid crystal layer 506, the scanning wiring electrodes (not shown in the drawing) and the signal wiring electrodes (not shown in the drawing) are formed in a matrix array and the first pixel electrodes 14 and the second pixel electrodes 15 made of ITO are driven through the thin film transistors (not shown in the drawing) formed in the vicinity of crossing points of the wiring electrodes.

On a counter glass substrate 508 which faces the glass substrate 1 in an opposed manner while sandwiching the liquid crystal layer 506 therebetween, color filters 507 and a color filter protective film OC are formed.

Polarizers 505 are respectively formed on outer surfaces of a pair of glass substrates 1, 508 and their polarization transmitting axes are arranged to cross each other at a right angle.

The liquid crystal layer 506 is filled between a lower orientation film ORI1 and an upper orientation film ORI2 which determine the direction of liquid crystal molecules and is sealed by a sealing member 520 (not shown in the drawing) which is served for fixing the glass substrate 1 and the counter glass substrate 508. The lower orientation film ORI1 is formed over an organic insulation film 23 at the glass substrate 1 side.

The liquid crystal display device is assembled in such a manner that the layers at the glass substrate 1 side and the layers at the counter glass substrate 508 side are separately formed and, thereafter, the upper and the lower glass substrates 1, 508 are superposed on each other, and the liquid crystal 506 is filled between the upper and lower glass substrate 1, 508.

By adjusting the transmission of light from the backlight BL using the pixel electrodes 14 and 15, a color liquid crystal display device of thin film transistor driving type can be realized.

By driving the liquid crystal layer using the electric field which is extended approximately along the surface of the substrate, there is no possibility that the liquid crystal molecules rise with respect to the surface of the substrate when the electric field is applied and the liquid cry al molecules are rotated within the surface of the substrate so that the image display can be performed by controlling the polarization direction of the transmitting light.

Accordingly, it is possible to substantially eliminate the viewing angle dependency of the contrast caused by the birefringence of the liquid crystal molecules so that the liquid crystal display device of high image quality with a wide viewing angle can be obtained.

Figure 21:
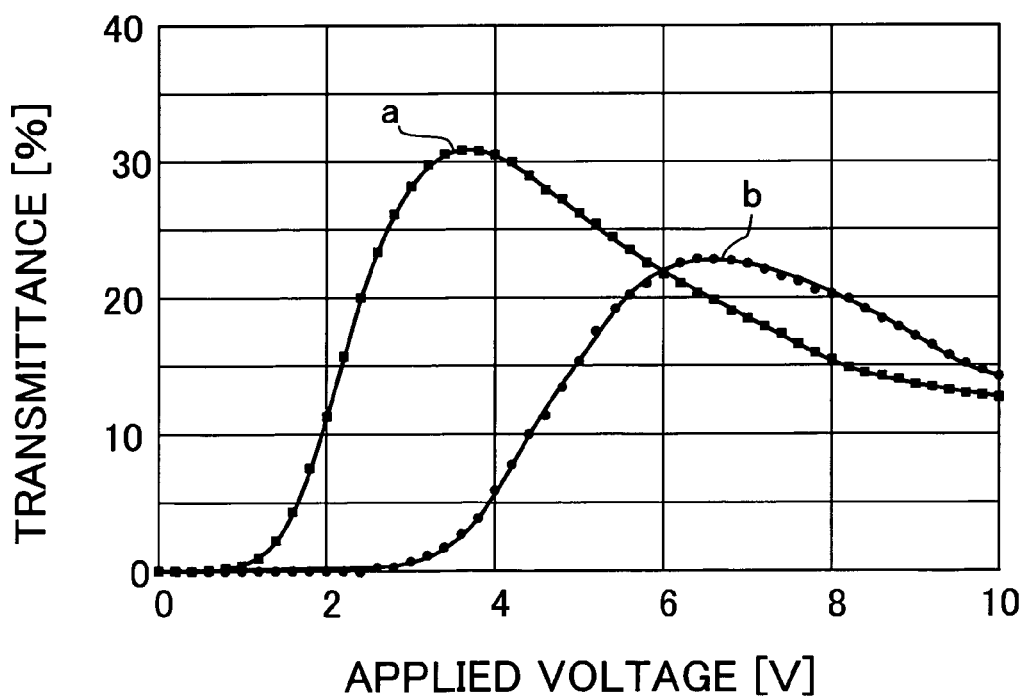
FIG. 21 is a graph showing the relationship between an applied voltage and the transmittance in the constitution shown in FIG. 20.

FIG. 21 shows voltage/brightness (B-V) characteristics of the liquid crystal display element shown in FIG. 20. "a" in the drawing indicates the B-V characteristics of the display device of the present invention and "b" in the drawing indicates the B-V characteristics of a conventional so-called lateral electric field type liquid crystal display element which uses metal electrodes with a distance of 14 μm between electrodes.

With the use of the display element of the present invention, the voltage at which the transmittance becomes the peak value can be reduced from the conventional approximately 7V to 3.5V. Further, it is also understood that the peak value of the transmittance is also largely enhanced.

These advantageous effects can be obtained by constituting two pixel electrodes using the transparent electrodes made of ITO and by forming these pixel electrodes into the comb-shaped electrodes having the width of 4 μm which are meshed with each other.

<<Another Embodiment of Constitution Including Liquid Crystal and Counter Substrate>>

FIG. 22 is a schematic cross-sectional view of liquid crystal cells of the partial reflection/transmission type liquid crystal display device according to the embodiment 6 or 7 of the present invention.

Although the cross-sectional constitution of the cells is substantially similar to that of the cells shown in the above-mentioned FIG. 20, the reflection electrodes 13' are provided as layers below portions of the comb-shaped electrodes for realizing the partial reflection/transmission display.

Figure 23:
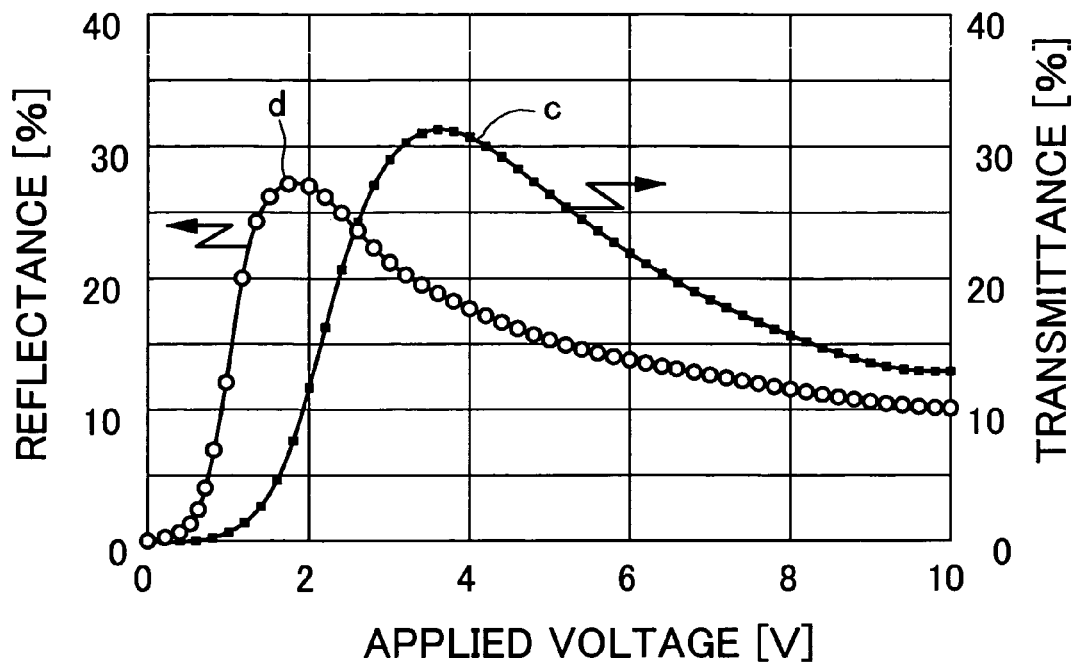
FIG. 23 is a graph showing the relationship among an applied voltage, the transmittance and the reflectance in the constitution shown in FIG. 22.

FIG. 23 shows the voltage/brightness characteristics of the liquid crystal display element shown in FIG. 22. In the drawing, "c" indicates the voltage dependency of the transmittance of the transmission display region and "d" indicates the voltage dependency of the reflectance of the reflection display region. The voltage which generates the maximum reflectance or the maximum transmittance differs between the reflection display and the transmission display.

In such a case, by adopting the constitutions shown in FIG. 17 and FIG. 18, by connecting the thin film transistors to a pair of respective pixel electrodes of the reflection part and the transmission part and by applying the optimal voltages to these pixel electrodes respectively, it is possible to obtain the favorable display characteristics.

<<One Embodiment of Constitution of Whole Display Device>>

Figure 24:
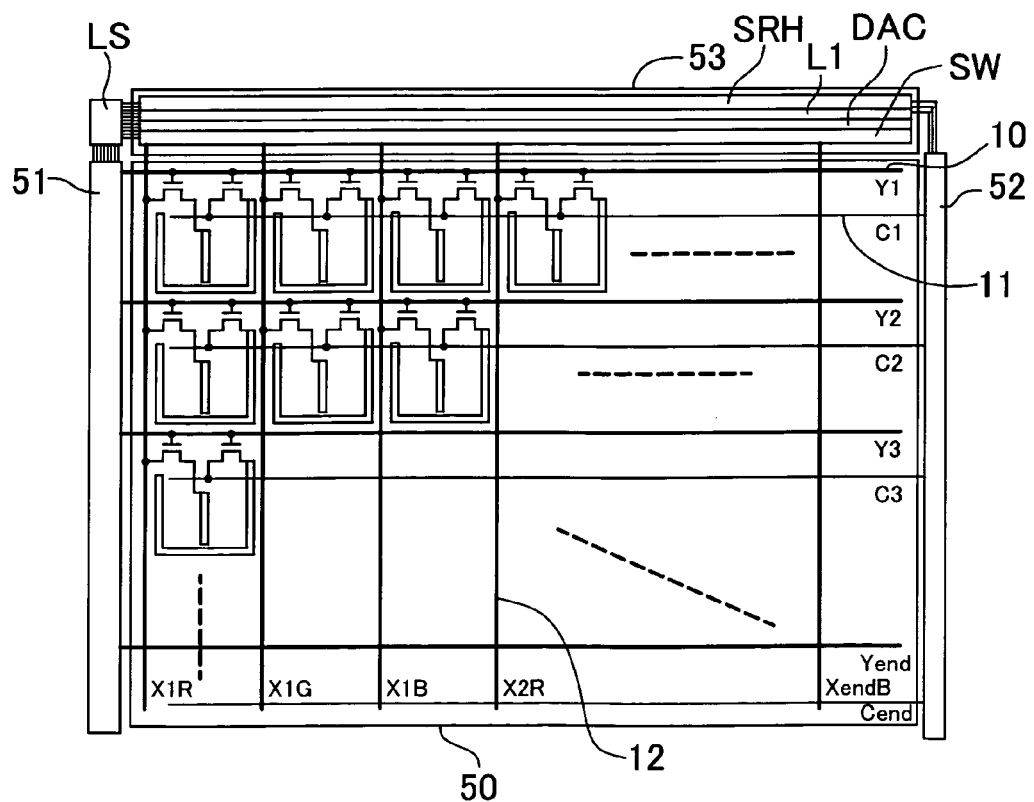
FIG. 24 is an equivalent circuit diagram showing one embodiment of the whole constitution of the liquid crystal display device of the present invention.

FIG. 24 shows an equivalent circuit of the hole display device which integrates peripheral driving circuits on the same substrate together with thin film transistor active matrix. For example, the display device includes the pixels having the constitution shown in FIG. 1 and FIG. 2, a thin film transistor active matrix 50 consisting of the scanning wiring electrodes 10 indicated by Y1-Yend, the first signal wiring electrodes 12 indicated by X1R, X1G, X1B-XendB and the second signal wiring electrodes 11 indicated by C1-Cend, a vertical scanning circuit 51 for driving the thin film transistor active matrix 50, the first signal-side driving circuit 53, the second signal-side driving circuit 52 which supplies signals to the second signal wiring electrodes 11, and a level shifter LS.

In this embodiment, the number of scanning lines is 600, the number of signal lines is 2400 and the diagonal size of the display part is approximately 5 inches.

Figure 5:
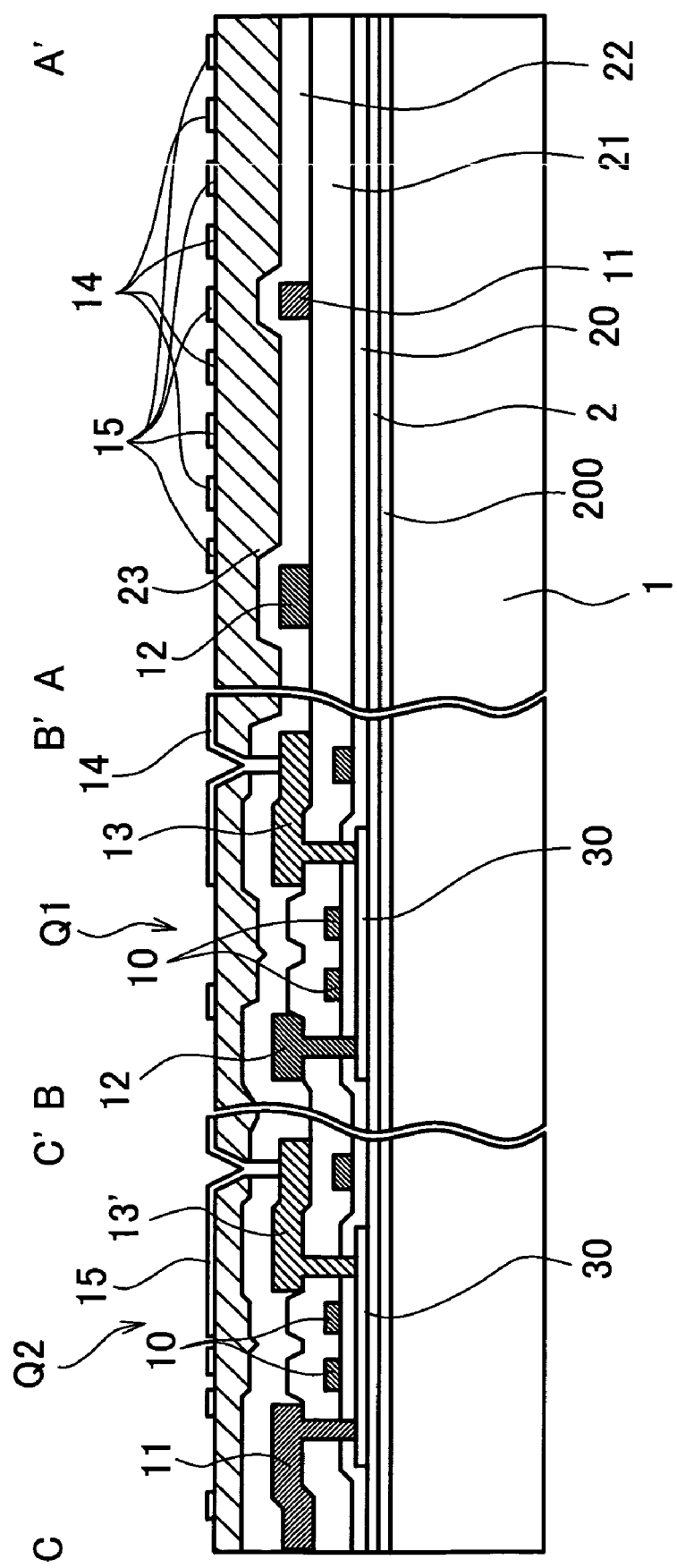
FIG. 5 is a cross-sectional view taken along a line A-A', B-B' and C-C' of FIG. 4.
Figure 25:
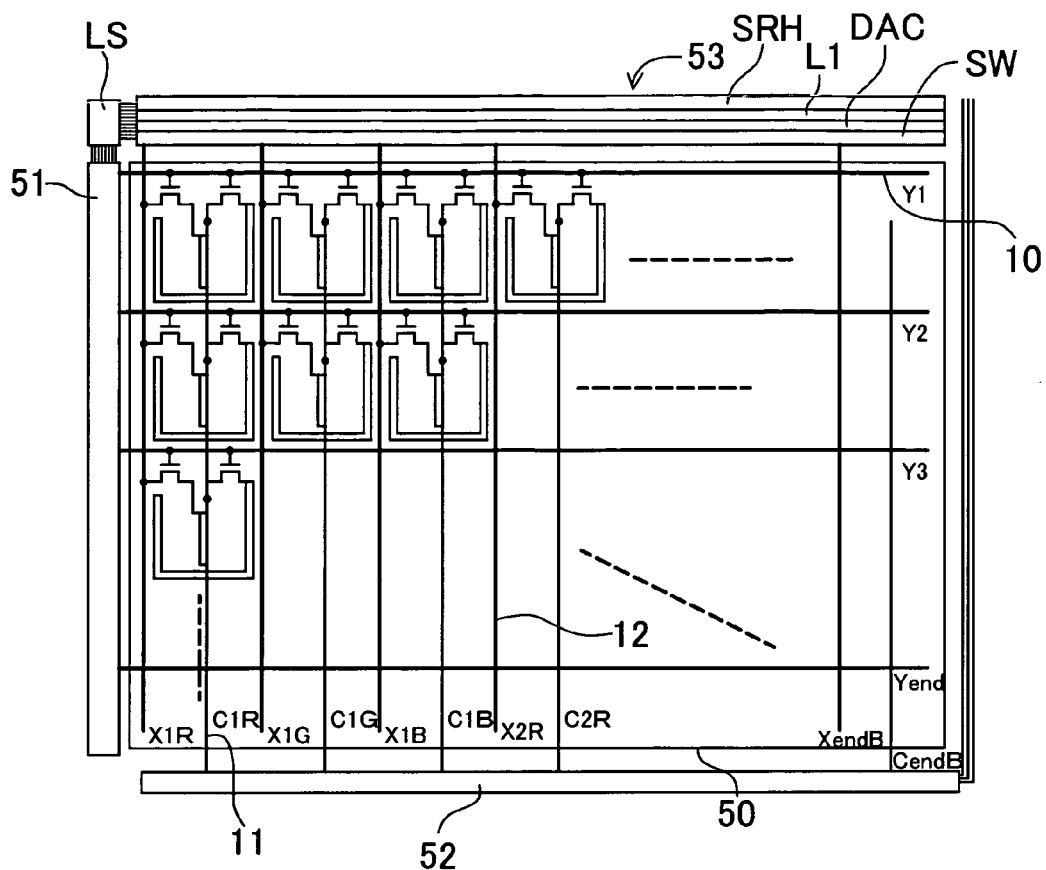
FIG. 25 is an equivalent circuit diagram showing another embodiment of the whole constitution of the liquid crystal display device of the present invention.

With respect to the configuration of the thin film transistor active matrix 50, as shown in FIG. 25, the pixels having the constitution shown in FIG. 4 and FIG. 5 may be used. In this case, the thin film transistor active matrix 50 is constituted of the scanning wiring electrodes 10 indicated by Y1-Yend, the first signal wiring electrode 12 indicated by X1R, X1G, X1B-XendB and the second signal wiring electrode 11 indicated by C1R-Clend. Further, the vertical scanning circuit 51 for driving the matrix 50, the first signal-side driving circuit 53, the second signal-side driving circuit 52 which supplies signals to the second signal wiring electrodes 11, and the level shifter LS are arranged in the periphery of the matrix 50. This configuration differs from the configuration of FIG. 24 in that the second signal-side driving circuit 52 is arranged at the lower side of the display part.

The vertical scanning circuit 51 is constituted of a shift register circuit driven by a vertical clock signal and the level shifter to which the row selection voltage is supplied and outputs the row selection pulse to the scanning wiring electrodes 10.

The horizontal scanning circuit (first signal-side driving circuit) 53 includes a shift register circuit SRH which is driven by a horizontal clock signal, a latch circuit L1 which latches image data DATA (not shown in the drawing) which is digitized into 6 bits, a digital-analogue converter circuit DAC which decodes the latched digital data to analogue data, a line memory LM (not shown in the drawing) which temporarily stores an output from the digital-analogue converter circuit DAC for 1 row, and an analogue switch SW which is served for supplying the image data stored in the line-memory LM to the first signal wiring electrodes 12. Here, the reference voltage signals which are weighted corresponding to respective bits are supplied to the digital-analogue converter circuit DAC.

These driving circuits are constituted of the complementary type (CMOS) poly-Si thin film transistors or N type poly-Si thin film transistors.

Figure 26:
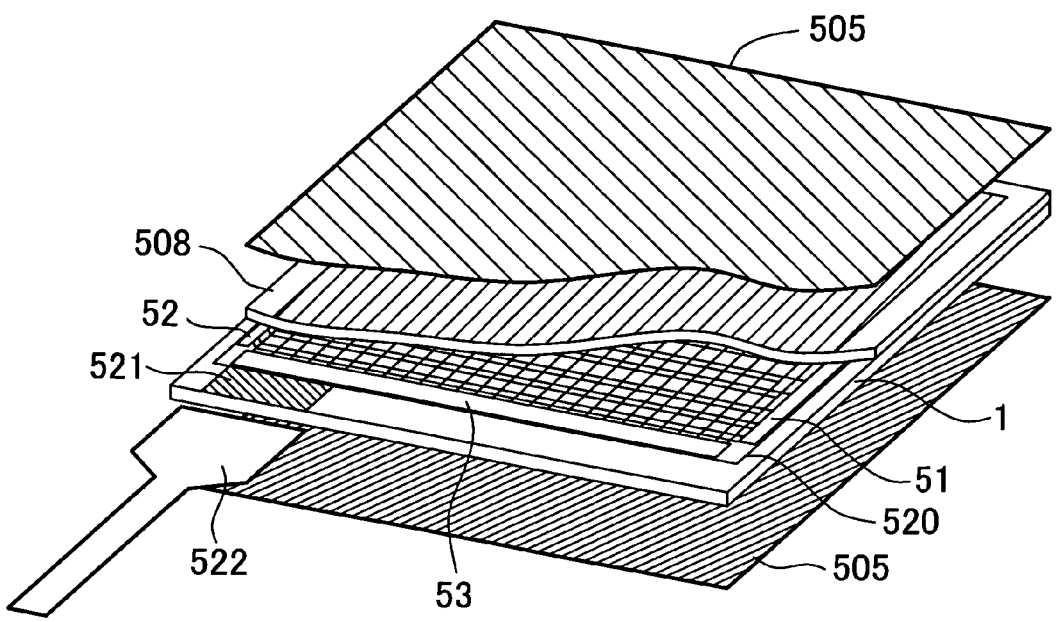
FIG. 26 is a perspective view of the liquid crystal display device shown in FIG. 24 or FIG. 25.

FIG. 26 is an overall constitutional view of the liquid crystal display element shown in FIG. 24 or FIG. 25. The glass substrate 1 on which the thin film transistor active matrix, the peripheral driving circuits and the like are formed and the counter glass substrate 508 which forms color filters on the inner surface thereof are laminated to each other by means of the sealing member 520 and the liquid crystal composition is filled in a space defined by the glass substrate 1, the counter glass substrate 508 and the sealing member 520. The polarization films (polarizers) 505 are arranged on the respective outer surfaces of the glass substrate 1 and the counter glass substrate 508 in such a manner that their polarization transmission axes cross each other at a right angle. Connection terminals 521 are formed at one side on the TFT substrate (glass substrate) 1 and display data, control signals, power source voltages and the like are supplied to the TFT substrate (glass substrate) 1 through FPCs 522 which are connected to the connection terminals 521.

Since the driving circuits such as the digital analogue converters and the like are integrated on the substrate using the poly-Si thin film transistors, the number of external connection terminals and the number of external parts can be largely reduced. Further, with the use of the pixels of the present invention, the liquid crystal driving voltage can be decreased so that the output voltage of the signal-side driving circuit can be reduced whereby the power consumption of such a circuit can be also reduced.

Accordingly, the adoption of the IPS mode driving method to the miniaturized LCD which has been difficult conventionally now becomes possible.

<<Another Embodiment of Constitution of the Whole Display Device>>

Figure 27:
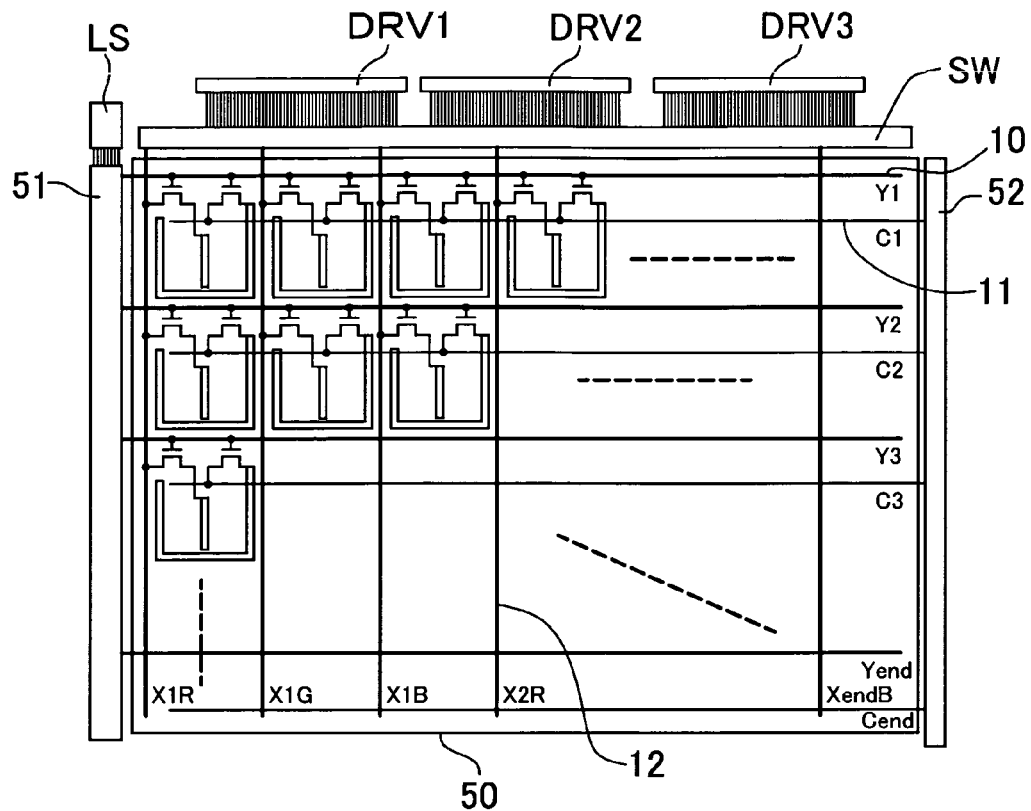
FIG. 27 is an equivalent circuit diagram showing another embodiment of the whole constitution of the liquid crystal display device of the present invention.

FIG. 27 shows an equivalent circuit of the whole display device which integrates a portion of the peripheral driving circuits on the same substrate together with the thin film transistor active matrix. For example, the display device includes the thin film transistor active matrix 50 consisting of the pixels having the constitution shown in FIG. 1 and FIG. 2, the scanning wiring electrodes 10 indicated by Y1-Yend, the first signal wiring electrodes 12 indicated by X1R, X1G, X1B-XendB, and the second signal wiring electrodes 11 indicated by C1-Cend, the vertical scanning circuit 51 for driving the matrix 50, the second signal-side driving circuit 52 for supplying signals to the second signal wiring electrodes 11, horizontal-side drivers LSIs DRV1-DRV3, a switching circuit SW for dividing outputs of the horizontal-side driver LSIs DRV1-DRV3 and supplying them into a plurality of first signal wiring electrodes 12, and a level-shifter LS. In this embodiment, the number of scanning lines is 480, the number of signal lines is 1980, and the diagonal size of the display part 1 is approximately 7 inches. Further, in this embodiment, all of the driving circuits formed of poly-Si thin film transistors are constituted by using only the N-type thin film transistors.

Figure 45:
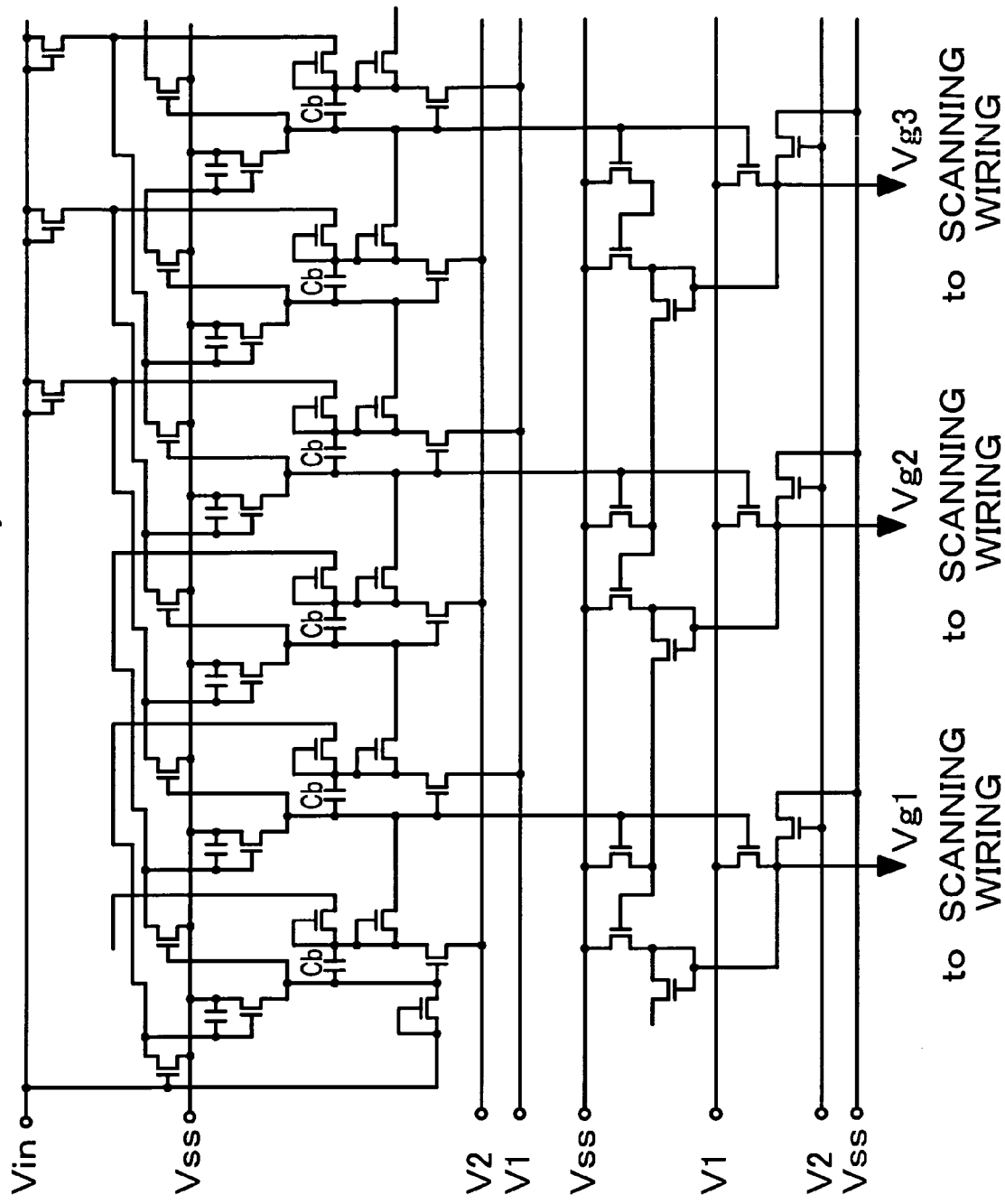
FIG. 45 is a circuit diagram showing an embodiment of a vertical scanning circuit of the liquid crystal display device according to the present invention.
Figure 46:
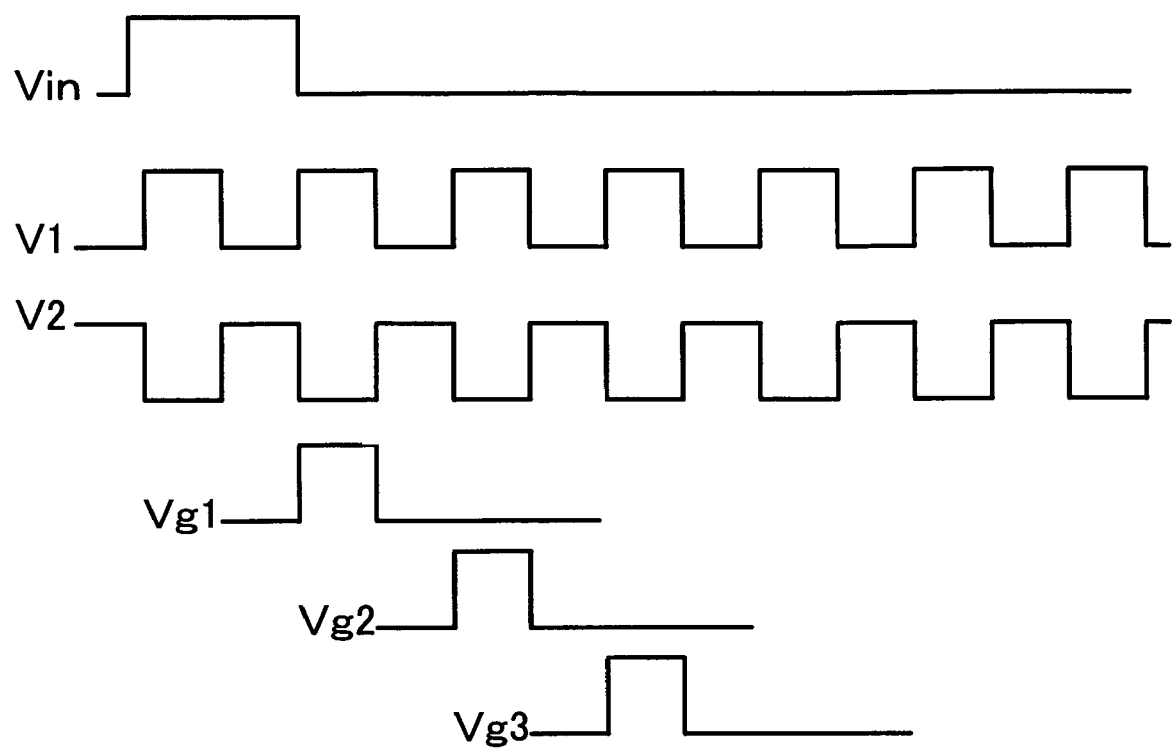
FIG. 46 is a view showing an example of a signal waveform of a circuit shown in FIG. 45.

FIG. 45 shows a vertical scanning circuit which is constituted by using only the N-type thin film transistors and FIG. 46 shows an example of waveforms of operational signals. The circuit is a dynamic circuit which is constituted of the N-type thin film transistors and bootstrap capacitance Cb and is driven based on a reference potential Vss, a start signal Vin, a clock pulse voltage V1 and a clock pulse voltage V2 which is complementary with the clock pulse voltage V1. The circuit is not provided with a power source voltage supply wiring which is usually necessary for the CMOS circuit and hence, the circuit is operated using the charge supplied from the complementary clock voltages of V1, V2. Accordingly, there exists no penetration current from the power source wiring to the grand wiring which causes a problem in a shift register circuit using an inverter circuit which is constituted of the N-type transistors and a load. Accordingly, the power consumption of the driving circuits can be reduced. Further, since the circuit is constituted of only the N-type thin film transistors, the manufacturing process is simplified compared to the manufacturing process of the circuit constituted of CMOS so that the circuit can be manufactured at a low cost.

Figure 28:
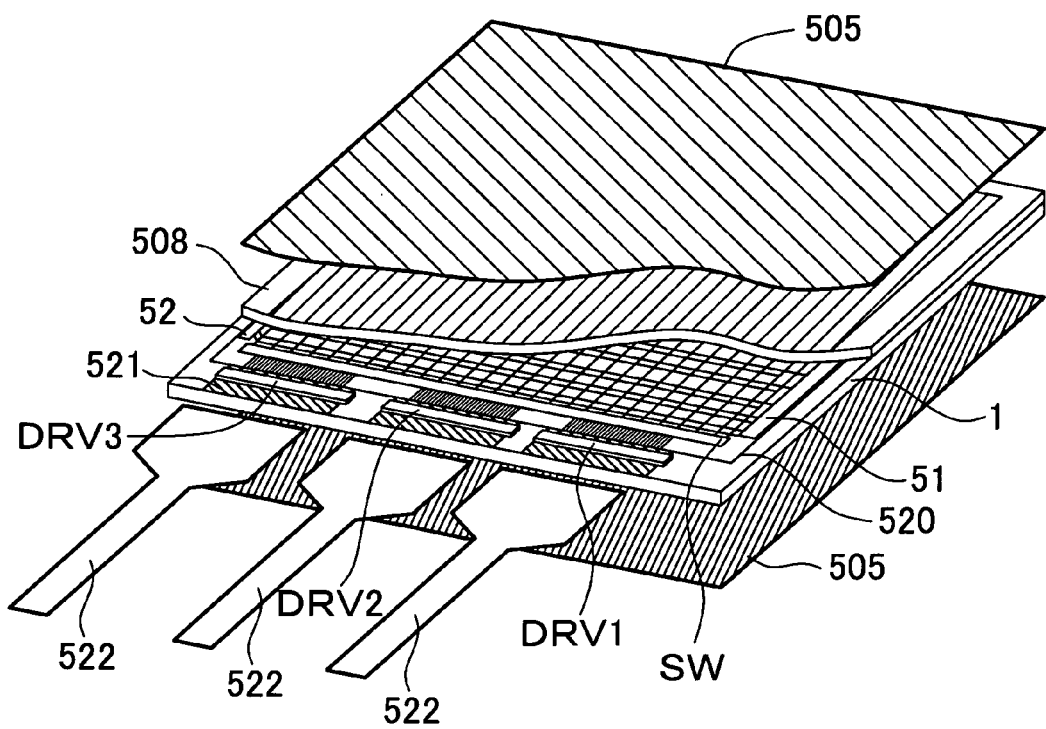
FIG. 28 is a perspective view of the liquid crystal display device shown in FIG. 27.

FIG. 28 is an overall perspective constitutional view of the liquid crystal display element shown in FIG. 27. The glass substrate 1 on which the thin film transistor active matrix, the peripheral driving circuits and the like are formed and the counter glass substrate 508 which forms color filters on the inner surface thereof are laminated to each other by means of the sealing member 520 and the liquid crystal composition is filled in a space defined by the glass substrate 1, the counter glass substrate 508 and the sealing member 520. The polarization films (polarizers) 505 are arranged on the respective outer surfaces of the glass substrate 1 and the counter glass substrate 508 in such a manner that their polarization transmission axes cross each other at a right angle. Horizontal-side-driver LSIs DRV1-DRV3 are directly mounted on one side of the TFT substrate (glass substrate) 1 and display data, control signals, power source voltages and the like are supplied to the driver LSIs through connection terminals 521 and FPCs 522 which are connected to the connection terminals 521.

In this embodiment, the conversion of digital display data into the analogue data is performed in the inside of the horizontal-side driver LSIs DRV1-DRV3. The peripheral driving circuits which are constituted of poly-Si thin film transistors are only constituted of the vertical-side scanning circuit (vertical scanning circuit 51) and the switching circuit SW which divides and supplies analogue data outputted from the driver LSIs (horizontal-side driver LSIs DRV1-DRV3) to a plurality of signal wiring (first signal wiring electrodes 12). Since the output of one driver LSI is divided into a plurality of signal wirings due to the horizontal-circuit-side switching circuit SW, the number of output pins of the driver LSI can be reduced. Due to such a constitution, the power consumption of the driver LSI can be reduced.

<One Embodiment of Manufacturing Method>

Subsequently, taking a TFT active matrix substrate which is used in a liquid crystal display element constituted of only the N type thin film transistors as shown in FIG. 28 as an example, the manufacturing steps thereof are explained in conjunction with FIG. 29 to FIG. 35.

After cleaning an upper surface of an alkalifree glass substrate 1 having a thickness of 500 μm, width 750 mm, a length 950 mm and a strain point of 670 degree centigrade, a $Si_3N_4$ film 200 having a film thickness of 50 nm is formed on the substrate 1 by a plasma CVD method using a mixed gas of $SiH_4$, $NH_3$ and $N_2$. Subsequently, by a plasma CVD method using a mixed gas of tetraethoxysilane and $O_2$, a $SiO_2$ film 2 having a film thickness of 120 nm is formed. The formation temperature of both of $Si_3N_4$ and $SiO_2$ is 400 degree centigrade.

Then, by a plasma CVD method using a mixed gas of $SiH_4$ and Ar, an intrinsic hydrogenated amorphous silicon film 300 having a film thickness of 50 nm is formed on the $SiO_2$ film 2. The film formation temperature is 400 degree centigrade and a hydrogen quantity immediately after the formation of film is approximately 5 at %. Then, the substrate is subjected to annealing for approximately 30 minutes at 450 degree centigrade so as to discharge hydrogen in the inside of the hydrogenated amorphous silicon film 300. The hydrogen quantity after annealing is approximately 1 at %.

Figure 29:
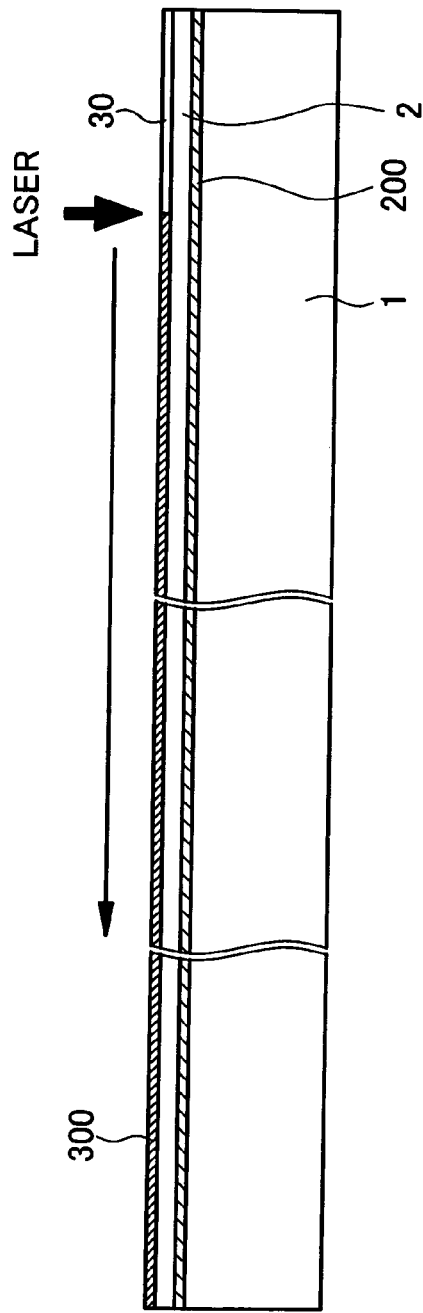
FIG. 29 is a cross-sectional view showing one embodiment of a manufacturing method of the liquid crystal display device according to the present invention, wherein the first step of the method is shown.

Subsequently, excimer laser light LASER having a wavelength of 308 nm is irradiated to the amorphous silicon film with the fluence of 400 mJ/cm$^2$ so as to obtain the approximately intrinsic poly-crystalline silicon film 30 by fusing and recrystallizing the amorphous silicon film. Here, the laser beam is formed in a thin line having a width of 0.3 mm and a length of 200 mm and is irradiated to the substrate while moving the substrate in the direction substantially perpendicular to the longitudinal direction of the beam at a pitch of 10 μm. The irradiation is performed in the nitrogen atmosphere (FIG. 29).

A given resist pattern is formed on the poly-silicon film 30 by a usual photolithography method and the poly-silicon film 30 is machined into a given shape by a reactive ion etching using a mixed gas of $CF_4$ and $O_2$.

Then, a $SiO_2$ film having a film thickness of 100 nm is formed by a plasma CVD method using a mixed gas made of tetraethoxysilane and oxygen so as to obtain a gate insulation film 20. The mixing ratio between the tetraethoxysilane and $O_2$ at this stage of operation is set to 1:50 and the formation temperature is 400 degree centigrade.

Subsequently, a Mo film having a film thickness of 200 nm is formed using a sputtering method and, thereafter, a given resist pattern PR is formed on the Mo film using a usual photolithography method. Then, the Mo film is machined in a given shape by a wet etching process using a mixed acid so that the scanning wiring electrodes 10 and the second signal wiring electrodes 11 are obtained.

Figure 30:
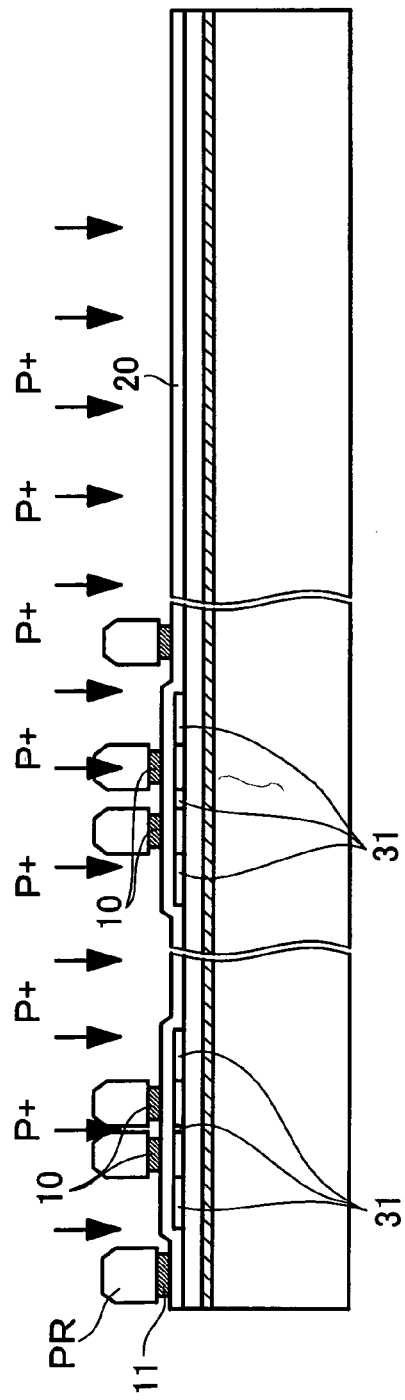
FIG. 30 is a cross-sectional view showing one embodiment of the manufacturing method of the liquid crystal display device according to the present invention, wherein the second step of the method is shown.

While leaving the resist pattern PR used for etching as it is, P ions are implanted by an ion implantation method with an acceleration voltage of 60 KeV and a dose quantity of 1E15 ($cm^{-2}$) thus forming the source and drain regions 31 of the N type thin film transistors (FIG. 30).

Figure 31:
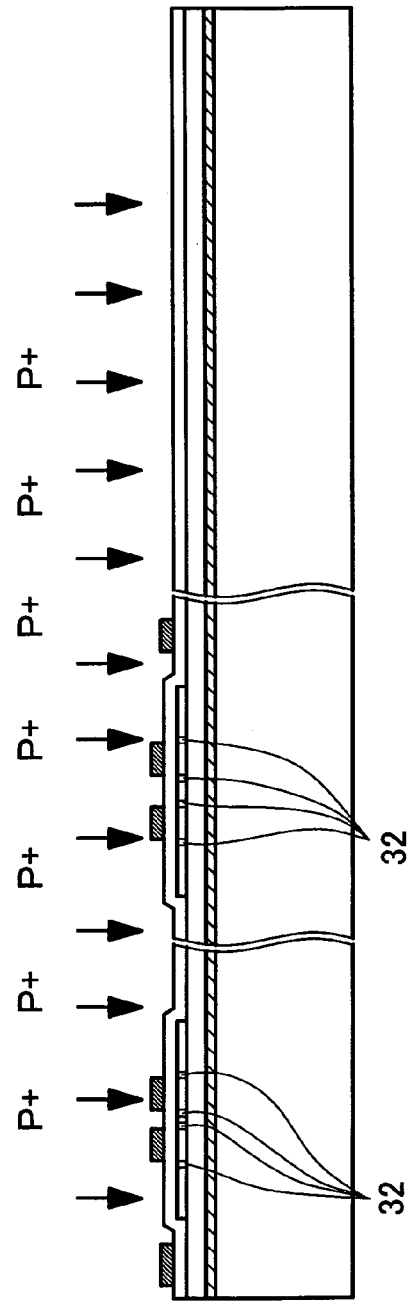
FIG. 31 is a cross-sectional view showing one embodiment of the manufacturing method of the liquid crystal display device according to the present invention, wherein the third step of the method is shown.

Subsequently, after removing the resist pattern PR used for etching, P ions are implanted again by an ion implantation method with an acceleration voltage of 65 KeV and a dose quantity of 2E13 ($cm^{-2}$) thus forming the LDD regions 32 of the N type thin film transistors (FIG. 31).

The length of the LDD region 32 is determined based on a side etching quantity of Mo when Mo is subjected to wet etching. In an example according to this embodiment, the length is approximately 0.8 μm. This length can be controlled by changing the over-etching time of Mo. The irregularities of the length of LDD in the inside of the substrate is approximately 0.1 μm and hence, the irregularities can be suppressed favorably. By adopting such a step, a mask pattern forming step for forming the LDD can be omitted and hence, the steps can be simplified.

Figure 32:
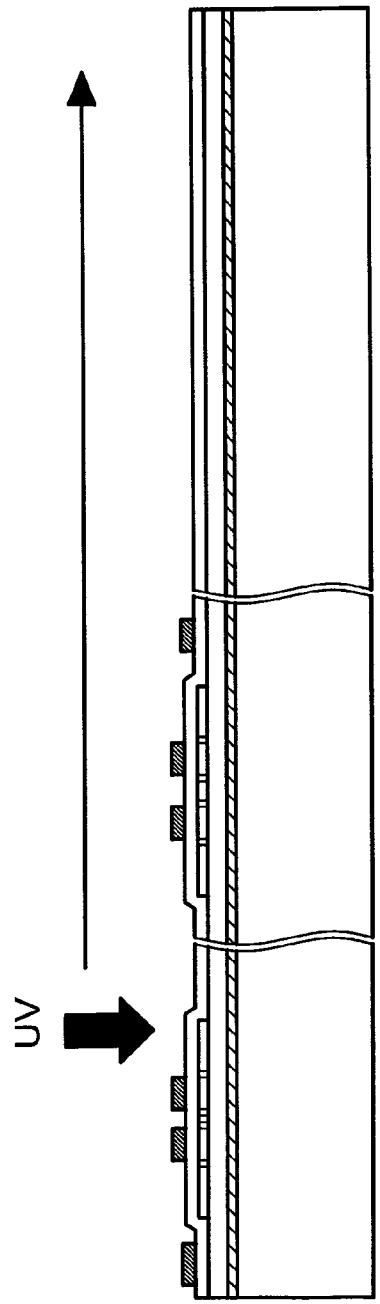
FIG. 32 is a cross-sectional view showing one embodiment of the manufacturing method of the liquid crystal display device according to the present invention, wherein the fourth step of the method is shown.

Subsequently, the implanted impurities are activated by a rapid thermal annealing (RTA) method which irradiates light of an excimer lamp or a metal halide lamp to the substrate. By performing the annealing using the light of the excimer lamp or the metal halide lamp which contains a large quantity of ultraviolet rays UV, only the poly-Si layers can be selectively heated so that damages caused by heating the glass substrate 1 can be obviated. The activation of the impurities can be performed by the heat treatment at a temperature of equal to or more than 450 degree centigrade provided that the heat treatment does not generate problems such as the shrinkage or deformation by bending of the substrate (FIG. 32).

Subsequently, a $SiO_2$ film having a film thickness of 500 nm is formed by a plasma CVD method using a mixed gas of tetraethoxysilane and oxygen thus obtaining an interlayer insulation film 21. Here, the mixture ratio of tetraethoxysilane and oxygen is 1:5 and the formation temperature is 350 degree centigrade.

Then, after forming a given resist pattern, a contact through hole is formed in the interlayer insulation film 21 by a wet etching process using a mixed acid. Subsequently, a Ti film having a film thickness of 50 nm, an Al—Nd alloy film having a film thickness of 500 nm and a Ti film having a film thickness of 50 nm are formed sequentially in a laminated manner by a sputtering method and, thereafter, a given resist pattern is formed. Thereafter, these films are etched altogether by a reactive ion etching process using a mixed gas of $BCl_3$ and $Cl_2$ thus obtaining the first signal wiring electrodes 12, the source electrodes 13, 13' and the connection electrodes 16 (FIG. 33).

A $Si_3N_4$ film (protective insulation film) 22 having a film thickness of 400 nm is formed by a plasma CVD method using a mixed gas of $SiH_4$, $NH_3$ and $N_2$. Further, acrylic photosensitive resin having a film thickness of approximately 3.5 μm is coated on the $Si_3N_4$ film 22 by a spin coating method and, thereafter, the exposure and the development are performed using a given mask to form a through hole in the acrylic resin. Subsequently, by performing the baking for 20 minutes at 230 degree centigrade so as to bake the acrylic resin thus obtaining an organic protective film (organic insulation film) 23 having a film thickness of 2.3 μm. Subsequently, using a through hole pattern provided to the organic protective film 23 as a mask, the $Si_3N_4$ film which constitutes a lower layer is machined by a reactive ion etching process using $CF_4$ thus forming a through hole in the $Si_3N_4$ film (FIG. 34).

In this manner, by machining the insulation film (protective insulation film) 22 which constitutes the lower layer using the organic protective film 23 as a mask, the films in two layers can be patterned with one photolithography step so that the steps can be simplified.

Figure 35:
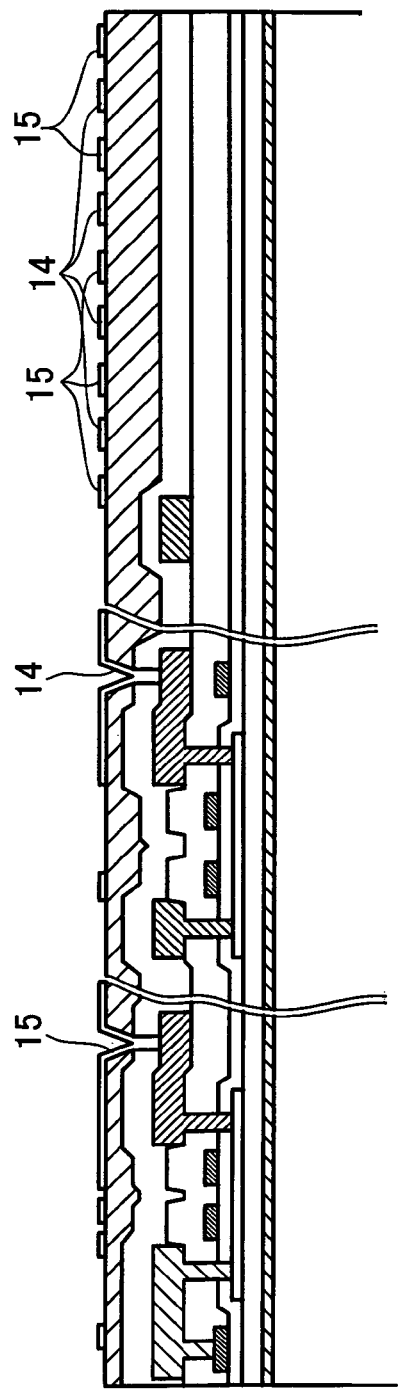
FIG. 35 is a cross-sectional view showing one embodiment of the manufacturing method of the liquid crystal display device according to the present invention, wherein the seventh step of the method is shown.

Finally, an ITO film having a film thickness of 70 nm is formed by a sputtering method and, thereafter, the ITO film is machined in a given shape by a wet etching process using a mixed acid thus forming the first and second pixel electrodes 14, 15 whereby the active matrix substrate is completed (FIG. 35).

<Another Embodiment of Manufacturing Method>

Subsequently, the manufacturing steps of the TFT active matrix substrate used in the liquid crystal display element having built-in driving circuits constituted of CMOS thin film transistors shown in FIG. 26 are explained in conjunction with FIG. 36 to FIG. 44.

After cleaning an upper surface of an alkalifree glass substrate 1 having a thickness of 500 μm, a width of 750 mm, a length of 950 mm and a strain point of 670 degree centigrade, a Si3NO4 film 200 having a film thickness of 50 nm is formed by a plasma CVD method using a mixed gas of $SiH_4$, $NH_3$ and $N_2$. Subsequently, by a plasma CVD method using a mixed gas of tetraethoxysilane and $O_2$, a $SiO_2$ film 2 having a film thickness of 120 nm is formed. The formation temperature of both of $Si_3N_4$ and $SiO_2$ is 400 degree centigrade.

Then, by a plasma CVD method using a mixed gas of $SiH_4$ and Ar, an intrinsic hydrogenerated amorphous silicon film 300 having a film thickness of 50 nm is formed on the $SiO_2$ film 2. The film formation temperature is 400 degree centigrade and a hydrogen quantity immediately after the formation of film is approximately 5 at %. Then, the substrate is subjected to annealing for approximately 30 minutes at 450 degree centigrade so as to discharge hydrogen in the inside of the hydrogenerated amorphous silicon film 300.

Figure 36:
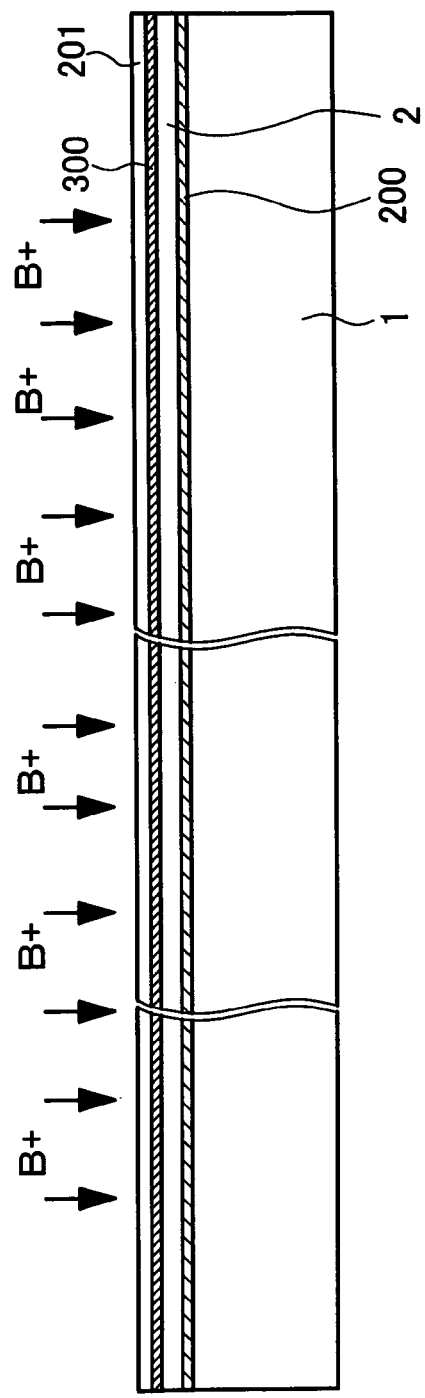
FIG. 36 is a cross-sectional view showing another embodiment of the manufacturing method of the liquid crystal display device according to the present invention, wherein the first step of the method is shown.

Then, a $SiO_2$ film 201 having a film thickness of 100 nm is formed by a plasma CVD method using a mixed gas made of tetraethoxysilane and $O_2$. Then, boron (B+) is implanted by an ion implantation method with an acceleration voltage of 40 KeV and a dose quantity of 5E12 ($cm^{-2}$). Boron is used for adjusting a threshold voltage of the thin film transistors (FIG. 36).

Figure 37:
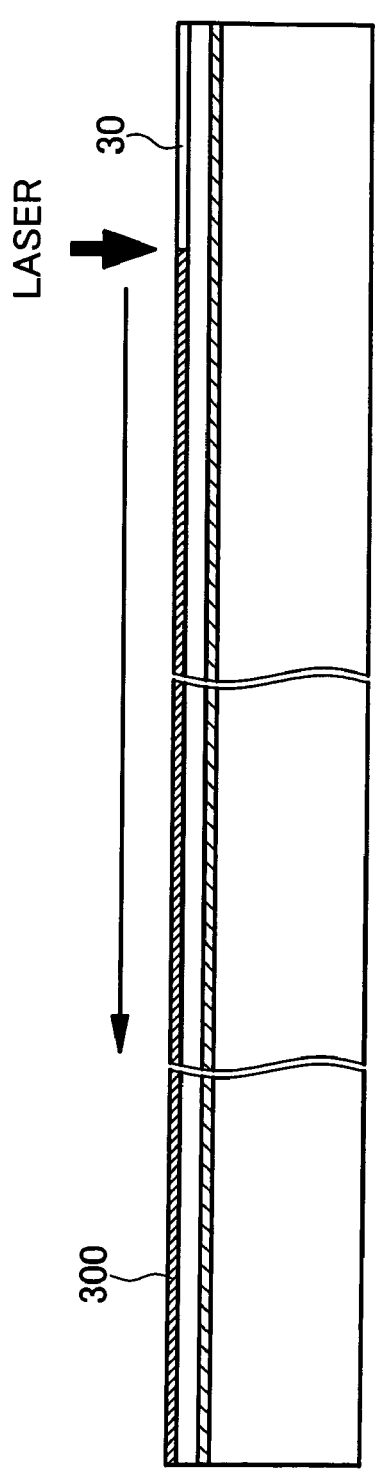
FIG. 37 is a cross-sectional view showing another embodiment of the manufacturing method of the liquid crystal display device according to the present invention, wherein the second step of the method is shown.

Subsequently, the $SiO_2$ film 201 is removed using a buffer hydrofluoric acid and, thereafter, excimer laser beams LASER having a wavelength of 308 nm are irradiated to the amorphous silicon film with the fluence of 400 mJ/$cm^2$ so as to fuse and re-crystallize the amorphous silicon film thus obtaining a P type polycrystalline silicon film 30 (FIG. 37).

Subsequently, a Mo film having a film thickness of 200 nm is formed using a sputtering method and, thereafter, a given resist pattern is formed on the Mo film using a usual photolithography method. Then, the Mo film is machined in a given shape by a reactive ion etching process using $CF_4$ so that the gate electrodes 10N of the N type thin film transistors are obtained.

Figure 38:
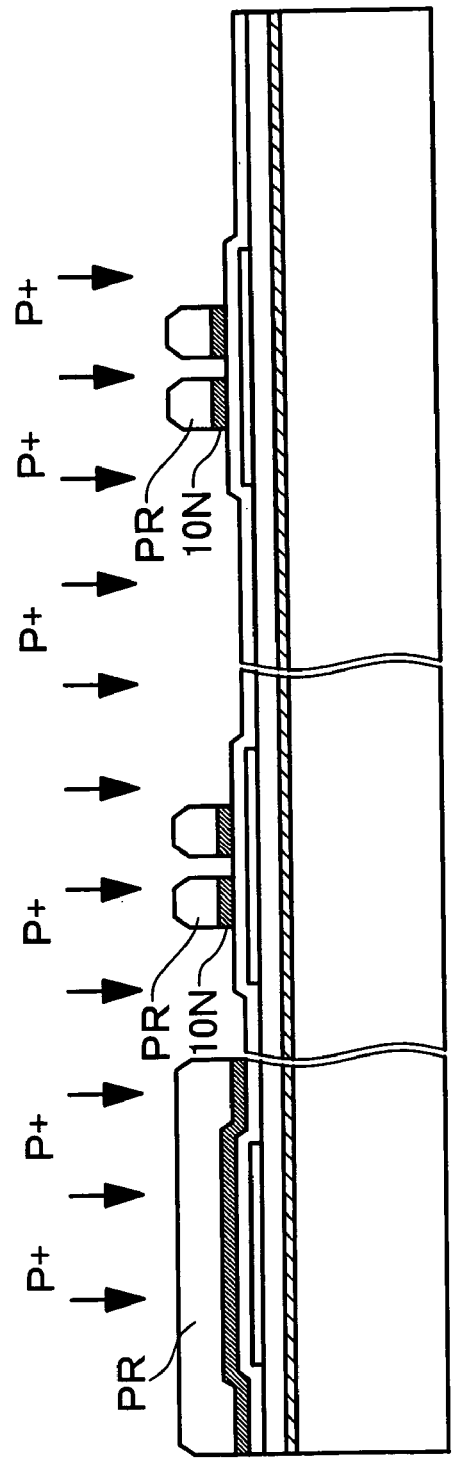
FIG. 38 is a cross-sectional view showing another embodiment of the manufacturing method of the liquid crystal display device according to the present invention, wherein the third step of the method is shown.

While leaving the resist pattern PR used for etching as it is, phosphorous (P) ions are implanted by an ion implantation method with an acceleration voltage of 60 KeV and a dose quantity of 1E15 ($cm^{-2}$) thus forming the source and drain regions 31 (not shown in the drawing) of the N type thin film transistors. Here, the P type thin film transistor (left side in FIG. 38) has the whole element protected by the pattern of the Mo film and the photo resist film PR so that the phosphorous ions are not implanted (FIG. 38).

Figure 39:
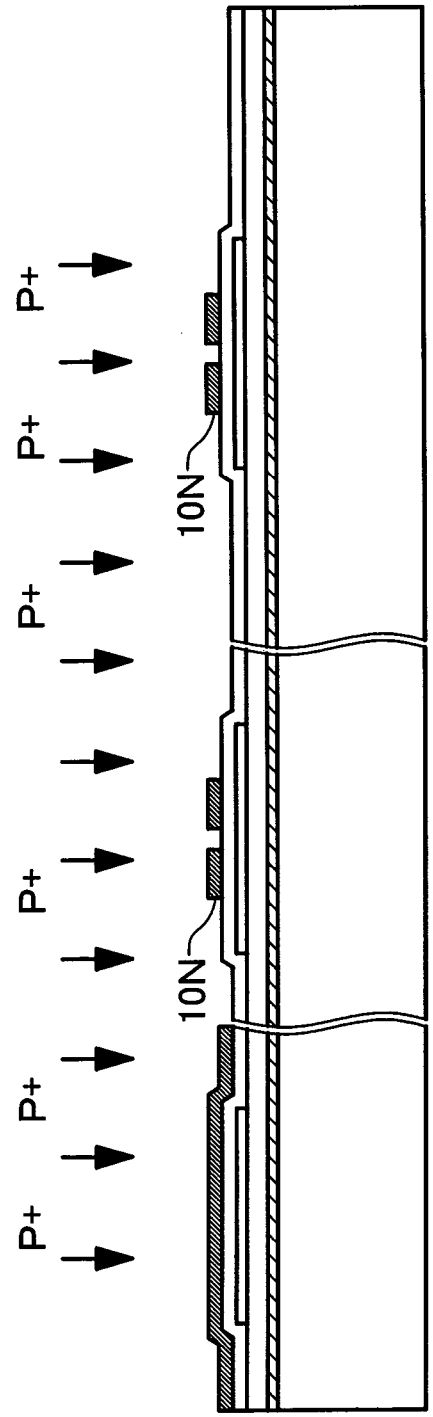
FIG. 39 is a cross-sectional view showing another embodiment of the manufacturing method of the liquid crystal display device according to the present invention, wherein the fourth step of the method is shown.

Subsequently, while leaving the resist pattern PR as it is, the substrate is processed with a mixed acid and the machined Mo electrodes are subjected to side etching so as to slim the pattern. Then, after removing the resist, P ions are implanted by an ion implantation method with an acceleration voltage of 65 KeV and a dose quantity of 2E13 ($cm^{-2}$) thus forming the LDD region 32 (not shown in the drawing) of the N type thin film transistor (FIG. 39).

In the same manner as the previously mentioned example, the length of the LDD region 32 is controlled based on the side etching time using a mixed acid.

Figure 40:
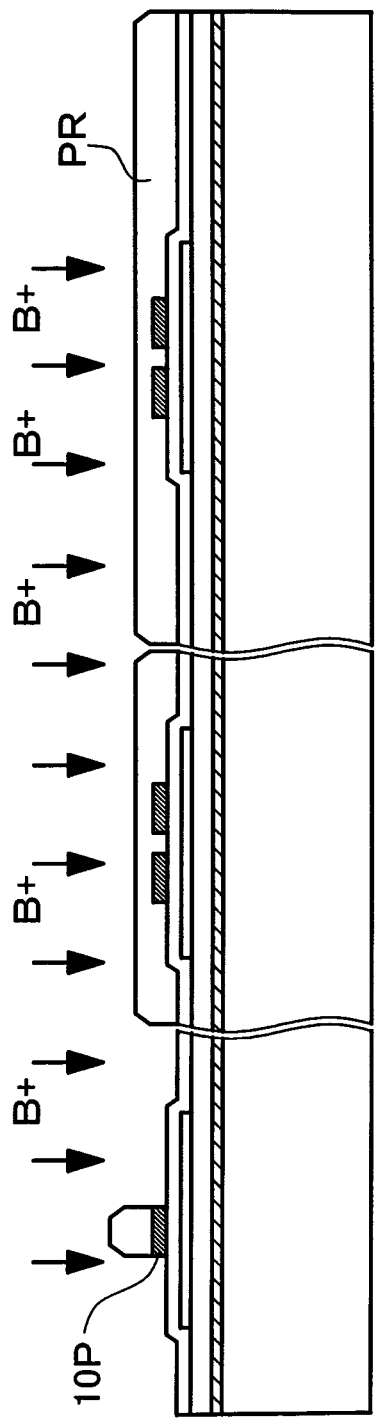
FIG. 40 is a cross-sectional view showing another embodiment of the manufacturing method of the liquid crystal display device according to the present invention, wherein the fifth step of the method is shown.

Subsequently, a given resist pattern PR is formed on the Mo film and the gate electrodes 10P of the P type thin film transistors and wiring patterns other than the thin film transistors are obtained by a reactive ion etching using $CF_4$. Here, the whole N type thin film transistor is protected by the photo resist pattern PR so that the transistor is protected from an etching gas (FIG. 40).

Subsequently, the implanted impurities are activated by a rapid thermal annealing (RTA) method which irradiates light UV of an excimer lamp or a metal halide lamp to the substrate (FIG. 41).

Subsequently, a $SiO_2$ film having a film thickness of 500 nm is formed by a plasma CVD method using a mixed gas of tetraethoxysilane and oxygen thus obtaining an interlayer insulation film 21.

Then, after forming a given resist pattern, a contact through hole is formed in the interlayer insulation film 21 by a wet etching process using a mixed acid. Subsequently, a Ti film having a film thickness of 50 nm, an Al—Nd alloy film having a film thickness of 500 nm and a Ti film having a film thickness of 50 nm are formed sequentially in a laminated manner by a sputtering and, thereafter, a given resist pattern is formed. Subsequently, these films are etched altogether by a reactive ion etching process using a mixed gas of $BCl_3$ and $Cl_2$ thus obtaining the first signal wiring electrodes 12, the source electrodes 13, 13' (not shown in the drawing) and the connection electrodes 16 (not shown in the drawing) (FIG. 42).

A $Si_3N_4$ film (protective insulation film) 22 having a film thickness of 400 nm is formed by a plasma CVD method using a mixed gas of $SiH_4$, $NH_3$ and $N_2$. Further, acrylic photosensitive resin having a film thickness of approximately 3.5 μm is coated on the $Si_3N_4$ film 22 by a spin coating method and, thereafter, the exposure and the development are performed using a given mask to form a through hole in the acrylic resin. Subsequently, by performing the baking for 20 minutes at 230 degree centigrade so as to bake the acrylic resin, an organic protective film 23 having a film thickness of 2.3 μm is obtained. Subsequently, using a through hole pattern provided to the organic protective film (organic insulation film) 23 as a mask, the $Si_3N_4$ film which constitutes a lower layer is machined by a reactive ion etching process using $CF_4$ thus forming a through hole in the $Si_3N_4$ film (FIG. 43).

Finally, an ITO film having a film thickness of 70 nm is formed by a sputtering method and, thereafter, the ITO film is machined in a given shape by a wet etching process using a mixed acid thus forming the first and second pixel electrodes 14, 15 whereby the active matrix substrate is completed (FIG. 44).

According to the manufacturing method of this embodiment, compared to the previous embodiment, it is possible to manufacture the TFT active matrix substrate having the CMOS circuit by merely increasing one sheet of mask.

As has been described heretofore, according to the present invention, the liquid crystal display device which exhibits the low power consumption, the wide viewing angle and the sufficient brightness can be realized at a low cost.

What is claimed is:

1. An in-plane switching liquid crystal display device comprising:
    a liquid crystal; and
    first and second substrates arranged with the liquid crystal therebetween,
    wherein the first substrate has formed thereon a reflection film which is conductive, an insulation film formed above the reflection film, a light-transmitting pixel electrode formed above the insulation film and a light transmitting counter electrode formed above the insulation film in each pixel region,
    the liquid crystal is driven by an electric field formed between the pixel electrode and the counter electrode of the first substrate,
    the reflection film has a first region which is overlapped with the pixel electrode, a second region which is overlapped with the counter electrode, and a third region which is overlapped with none of the pixel electrode and the counter electrode when viewed in a plan view, and
    the reflection film is supplied with a voltage through a switching element which is arranged at said each pixel region.

2. An in-plane switching liquid crystal display device according to claim 1, wherein the reflection film is formed at a portion of the pixel region.

3. An in-plane switching liquid crystal display device according to claim 1, wherein the reflection film is formed at a substantially whole region of the pixel region.

4. An in-plane switching liquid crystal display device according to claim 1, wherein the reflection film is a two-layered film made of Al/Mo with a Al layer on top of a Mo layer.

5. An in-plane switching liquid crystal display device according to claim 1, wherein the light-transmitting pixel electrode is made of indium-tin-oxide (ITO).

6. An in-plane switching liquid crystal display device according to claim 1, wherein the light-transmitting counter electrode is made of indium-tin-oxide (ITO).

7. An in-plane switching liquid crystal display device according to claim 1, wherein the counter electrode is formed directly on the insulation film.

8. An in-plane switching liquid crystal display device according to claim 1, wherein the counter electrode is formed only on the first substrate.

* * * * *